US011665687B2

(12) United States Patent
Manolakos et al.

(10) Patent No.: US 11,665,687 B2
(45) Date of Patent: May 30, 2023

(54) COMMON MEASUREMENT AND TRANSMISSION WINDOW FOR DOWNLINK AND UPLINK POSITIONING REFERENCE SIGNAL PROCESSING AND TRANSMISSION

(71) Applicant: QUALCOMM Incorporated, San Diego, CA (US)

(72) Inventors: Alexandros Manolakos, Escondido, CA (US); Guttorm Ringstad Opshaug, Redwood City, CA (US); Sven Fischer, Nuremberg (DE)

(73) Assignee: QUALCOMM INCORPORATED, San Diego, CA (US)

( * ) Notice: Subject to any disclaimer, the term of this patent is extended or adjusted under 35 U.S.C. 154(b) by 200 days.

(21) Appl. No.: 17/065,142

(22) Filed: Oct. 7, 2020

(65) Prior Publication Data
US 2021/0144735 A1    May 13, 2021

Related U.S. Application Data

(60) Provisional application No. 62/932,323, filed on Nov. 7, 2019.

(51) Int. Cl.
*H04W 72/12* (2023.01)
*H04W 24/08* (2009.01)
(Continued)

(52) U.S. Cl.
CPC ....... *H04W 72/1263* (2013.01); *H04W 24/08* (2013.01); *H04W 24/10* (2013.01)

(58) Field of Classification Search
CPC . H04W 72/1263; H04W 24/08; H04W 24/10; H04W 88/02; H04W 88/08;
(Continued)

(56) References Cited

U.S. PATENT DOCUMENTS

2015/0189610 A1* 7/2015 Siomina ............... H04L 5/14
                                                        370/280
2018/0375631 A1* 12/2018 Li ................. H04W 72/0446
(Continued)

OTHER PUBLICATIONS

Intel, "Remaining Details of DL PRS Design for NR Positioning", "R1-1910674", 3GPP TSG RAN WG1 Meeting #98bis, Chongqing, China, Oct. 2019 (Year: 2019).*

(Continued)

*Primary Examiner* — Walli Z Butt
*Assistant Examiner* — Thad N Defauw
(74) *Attorney, Agent, or Firm* — Muncy, Geissler, Olds & Lowe, P.C.

(57) ABSTRACT

Disclosed are techniques for wireless communication. In an aspect, a user equipment (UE) engaged in a positioning session with a plurality of transmission-reception points (TRPs) receives a downlink positioning reference signal (DL-PRS) configuration specifying one or more DL-PRS resource sets of a DL-PRS instance, wherein all DL-PRS resources of the one or more DL-PRS resource sets of the DL-PRS instance are scheduled within a time window, and receives an uplink PRS (UL-PRS) configuration specifying one or more UL-PRS resource sets, wherein all of the one or more UL-PRS resources are scheduled within the time window. The UE may perform, during the time window, measurements of DL-PRS transmissions on one or more DL-PRS resources of the one or more DL-PRS resource sets, and transmit, during the time window, at least one UL-PRS on the one or more UL-PRS resources.

74 Claims, 15 Drawing Sheets

(51) Int. Cl.
*H04W 24/10* (2009.01)
*H04W 72/1263* (2023.01)

(58) Field of Classification Search
CPC ..... H04W 64/00; H04B 7/0695; H04B 7/088; H04L 27/261; H04L 5/0094; H04L 5/0051; H04L 5/0048; H04L 1/18; H04L 5/001; H04L 27/26025
See application file for complete search history.

(56) References Cited

U.S. PATENT DOCUMENTS

| | | | |
|---|---|---|---|
| 2021/0058891 A1* | 2/2021 | Huang | H04W 24/10 |
| 2021/0352613 A1* | 11/2021 | Yoon | H04L 5/0032 |
| 2022/0060243 A1* | 2/2022 | Keating | H04B 7/0408 |

OTHER PUBLICATIONS

Intel Corporation: "Remaining Details of DL PRS Design for NR Positioning", 3GPP Draft, 3GPP TSG RAN WG1 Meeting #98bis, R1-1910674, Intel—NRPOS DLRS, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), pp. 1-28. XP051808639, Retrieved from the Internet: URL: https://ftp.3gpp.org/tsg_ran/WG1_RL1/TSGR1_98b/Docs/R1-1910674.zip. R1-1910674 Intel—NRPOS DLRS.docx [retrieved on—Oct. 5, 2019], p. 1. lines 22-23 p. 8. lines 20-27 p. 9. lines 12. 22 p. 10. lines 1-2. 12-13 p. 11. lines 3-4 p. 12. lines 3-6 figure 4.
International Search Report and Written Opinion—PCT/US2020/054743—ISA/EPO—dated Feb. 11, 2021.
Qualcomm Incorporated: "DL and UL NR Positioning Procedures", 3GPP Draft, 3GPP TSG-RAN WG2 Meeting #107bis, R2-1913395 (Positioning Procedures + Draft LPP CR), 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), pp. 1-53, XP051804974, Retrieved from the Internet: URL: https://ftp.3gpp.org/tsg_ran/WG2_RL2/TSGR2_107bis/Docs/R2-1913395.zip. R2-1913395 (Positioning Procedures + Draft LPP CR).docx [retrieved on Oct. 4, 2019] Par. 3 p. 5. lines 4-5 p. 6. line 11—p. 7. line 2 p. 7. lines 8-20 figure 4.

* cited by examiner

COMMON MEASUREMENT AND TRANSMISSION WINDOW FOR DOWNLINK AND UPLINK POSITIONING REFERENCE SIGNAL PROCESSING AND TRANSMISSION

CROSS-REFERENCE TO RELATED APPLICATIONS

The present Application for Patent claims the benefit of U.S. Provisional Application No. 62/932,323, entitled "COMMON MEASUREMENT AND TRANSMISSION WINDOW FOR DOWNLINK AND UPLINK POSITIONING REFERENCE SIGNAL PROCESSING AND TRANSMISSION," filed Nov. 7, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) engaged in a positioning session with a plurality of transmission-reception points (TRPs) includes receiving a downlink positioning reference signal (DL-PRS) configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and receiving an uplink PRS (UL-PRS) configuration specifying one or more UL-PRS resource sets, wherein each UL-PRS resource set comprises one or more UL-PRS resources, and wherein all of the one or more UL-PRS are scheduled within the time window.

In an aspect, a method of wireless communication performed by a positioning entity includes transmitting, to a UE engaged in a positioning session with a plurality of TRPs, a DL-PRS configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and transmitting, to the UE, an UL-PRS configuration specifying one or more UL-PRS resource sets, wherein each UL-PRS resource set comprises one or more UL-PRS resources, and wherein all of the one or more UL-PRS are scheduled within the time window.

In an aspect, a UE includes a memory; at least one transceiver; and at least one processor communicatively coupled to the memory and the at least one transceiver, the at least one processor configured to: receive, during a positioning session with a plurality of TRPs, via the at least one transceiver, a DL-PRS configuration specifying one or more DL-PRS resource sets, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and receive, via the at least one transceiver, an UL-PRS configuration specifying one or more UL-PRS resource sets, wherein each UL-PRS resource set comprises one or more UL-PRS resources, and wherein the one or more UL-PRS resources are scheduled within the time window.

In an aspect, a positioning entity includes a memory; at least one network interface; and at least one processor communicatively coupled to the memory and the at least one processor, the at least one processor configured to: cause the at least one network interface to transmit, to a UE engaged in a positioning session with a plurality of TRPs, a DL-PRS configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and cause the at least one network interface to transmit, to the UE, an UL-PRS configuration specifying one or more UL-PRS resource sets, wherein each UL-PRS resource set comprises one or more UL-PRS resources, and wherein the one or more UL-PRS resources are scheduled within the time window.

In an aspect, a UE includes means for receiving, during a positioning session with a plurality of TRPs, a DL-PRS configuration specifying one or more DL-PRS resource sets, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and means for receiving an UL-PRS configuration specifying one or more UL-PRS resource sets, wherein each UL-PRS resource set comprises one or more UL-PRS resources, and wherein the one or more UL-PRS resources are scheduled within the time window.

In an aspect, a positioning entity includes means for transmitting, to a UE engaged in a positioning session with a plurality of TRPs, a DL-PRS configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and means for transmitting, to the UE, an UL-PRS configuration specifying one or more UL-PRS resource sets, wherein each UL-PRS resource set comprises one or more UL-PRS resources, and wherein the one or more UL-PRS resources are scheduled within the time window.

In an aspect, a non-transitory computer-readable medium storing computer-executable instructions includes computer-executable instructions comprising: at least one instruction instructing a UE engaged in a positioning session with a plurality of TRPs to receive a DL-PRS configuration specifying one or more DL-PRS resource sets, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and at least one instruction instructing the UE to receive an UL-PRS configuration specifying one or more UL-PRS resource sets, wherein each UL-PRS resource set comprises one or more UL-PRS resources, and wherein the one or more UL-PRS resources are scheduled within the time window.

In an aspect, a non-transitory computer-readable medium storing computer-executable instructions includes computer-executable instructions comprising: at least one instruction instructing a positioning entity to transmit, to a UE engaged in a positioning session with a plurality of TRPs, a DL-PRS configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and at least one instruction instructing the positioning entity to transmit, to the UE, an UL-PRS configuration specifying one or more UL-PRS resource sets, wherein each UL-PRS resource set comprises one or more UL-PRS resources, and wherein the one or more UL-PRS resources are scheduled within the time window.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
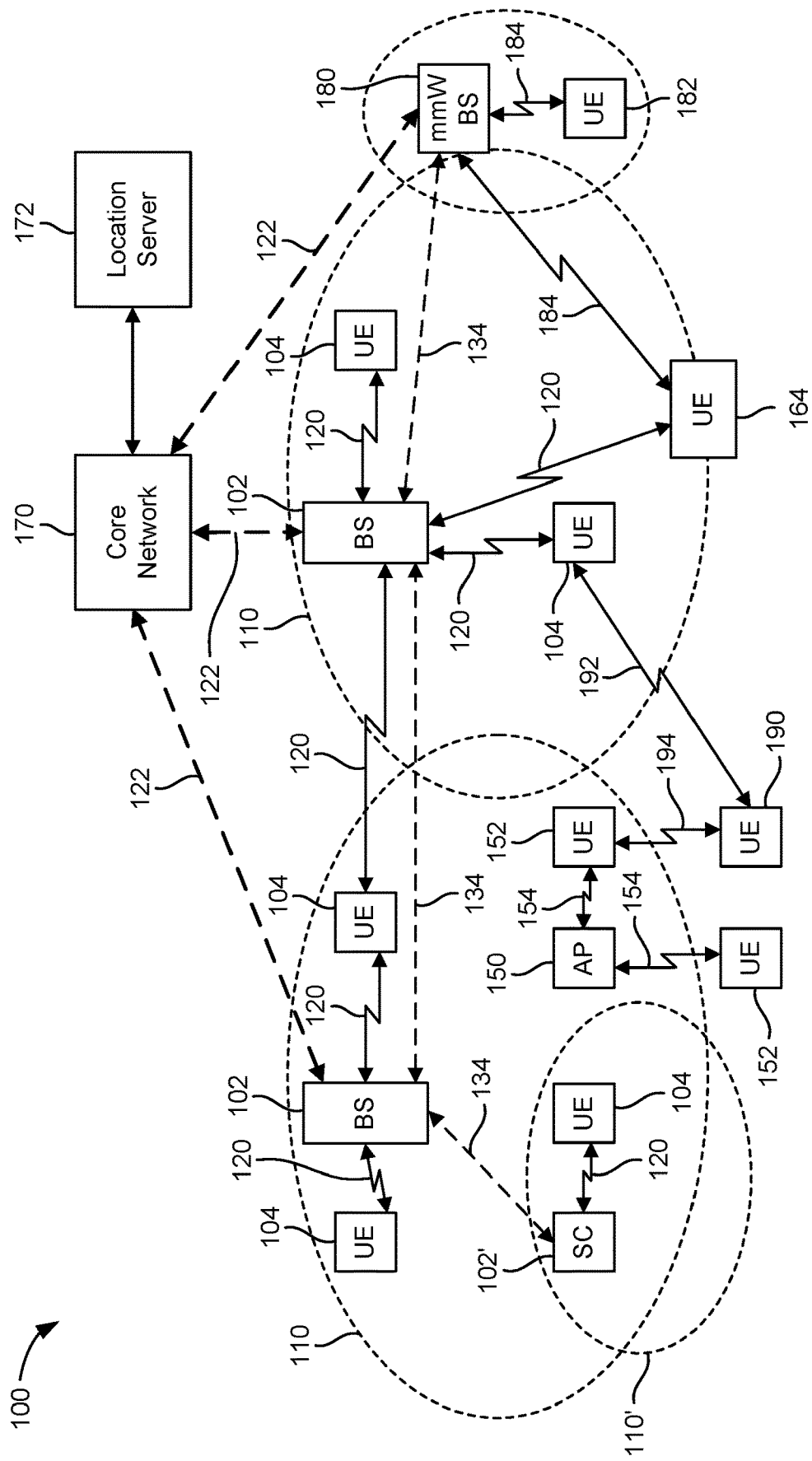
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), navigation reference signals (NRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
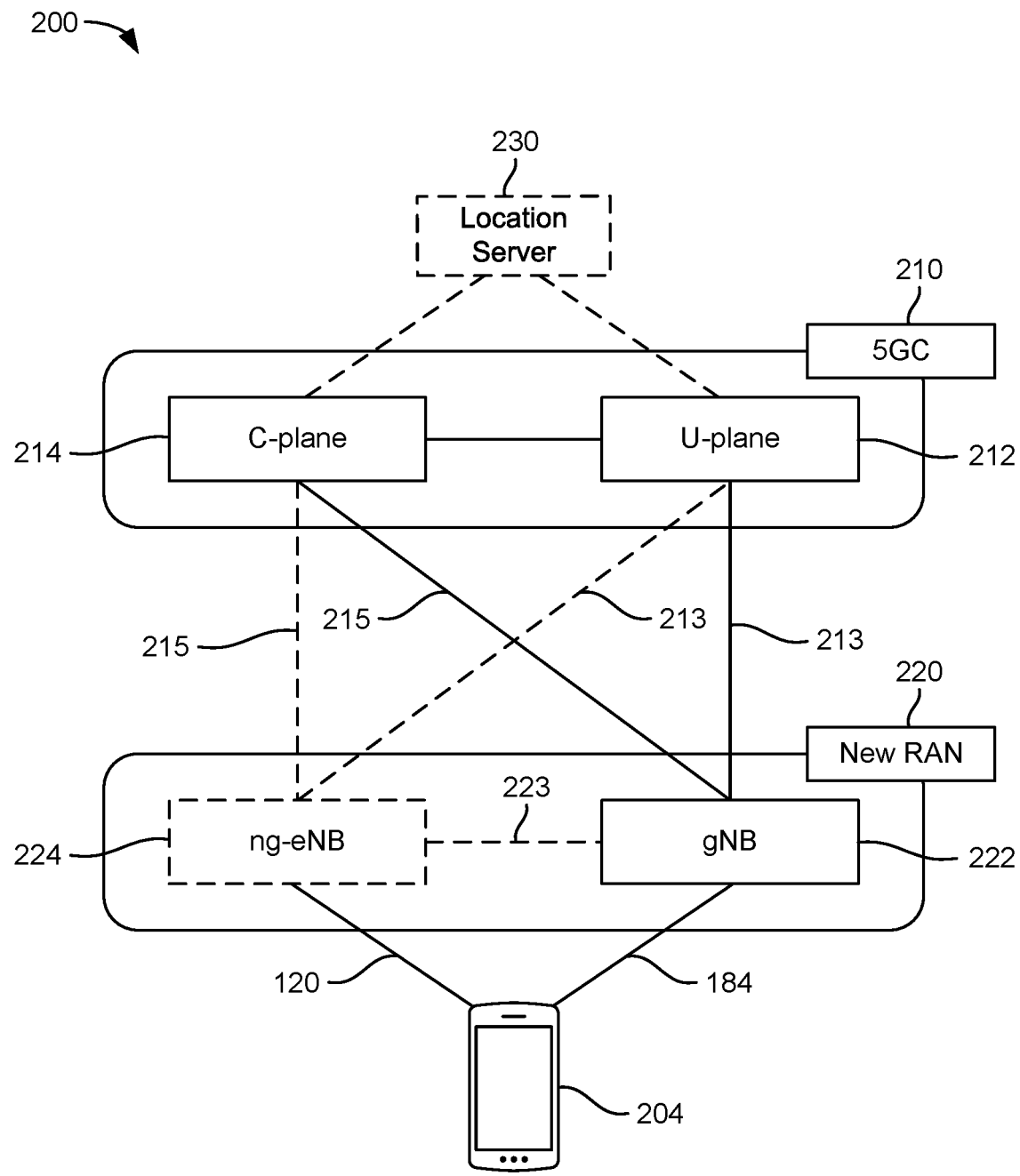
FIGS. 2A and 2B illustrate example wireless network structures, according to various aspects.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
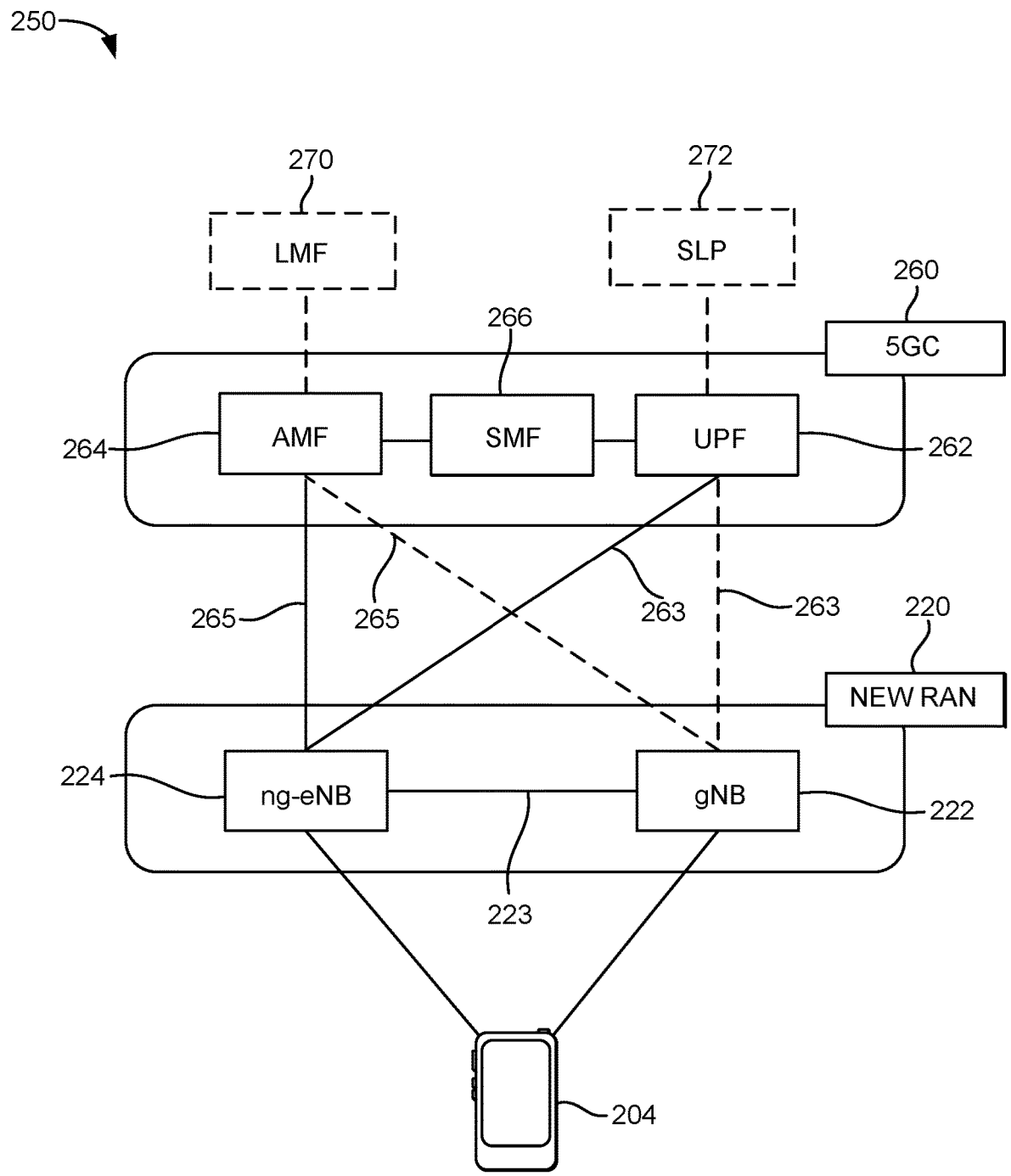

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
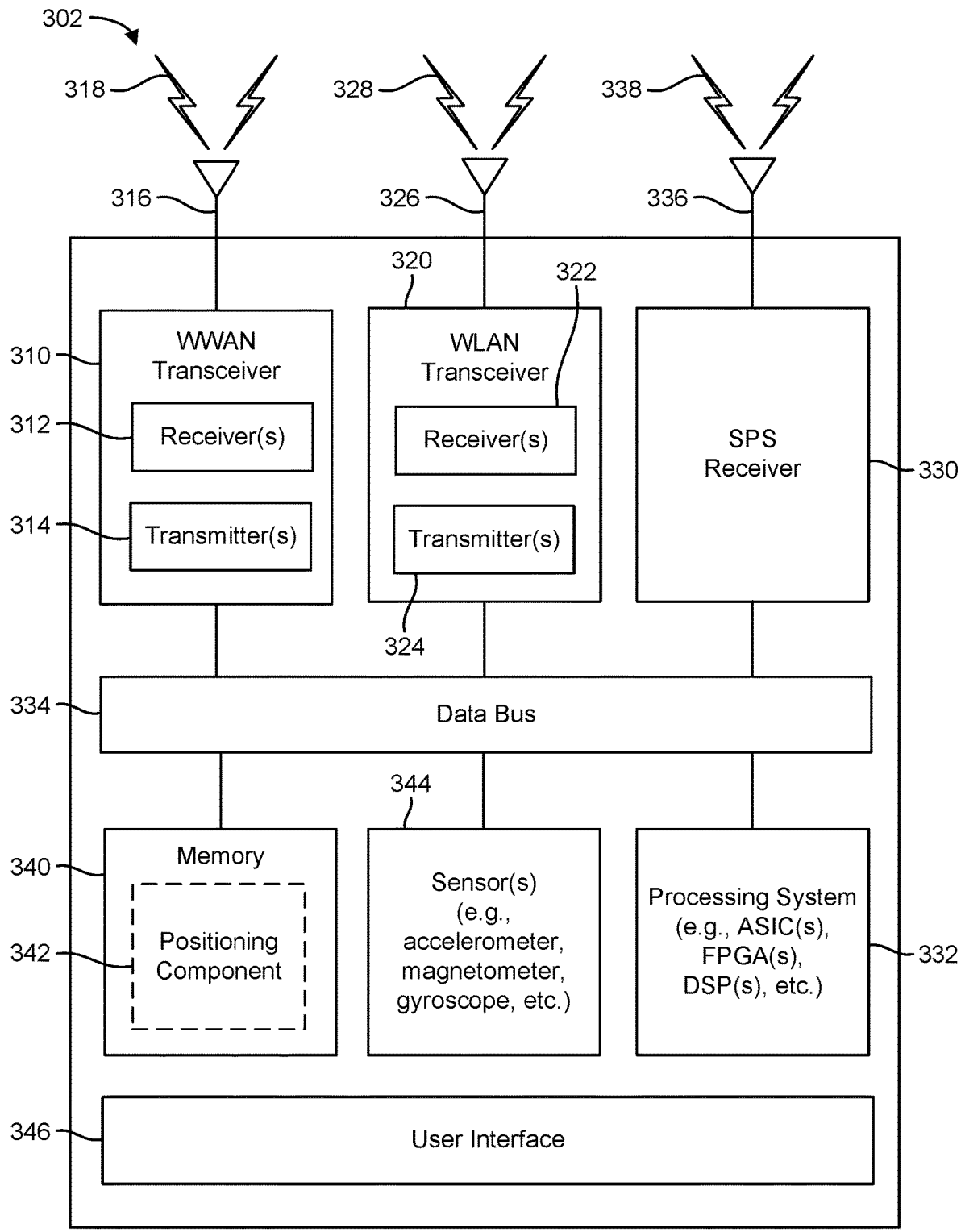
FIGS. 3A to 3C are simplified block diagrams of several sample aspects of components that may be employed in a user equipment (UE), a base station, and a network entity, respectively.
Figure 3B:
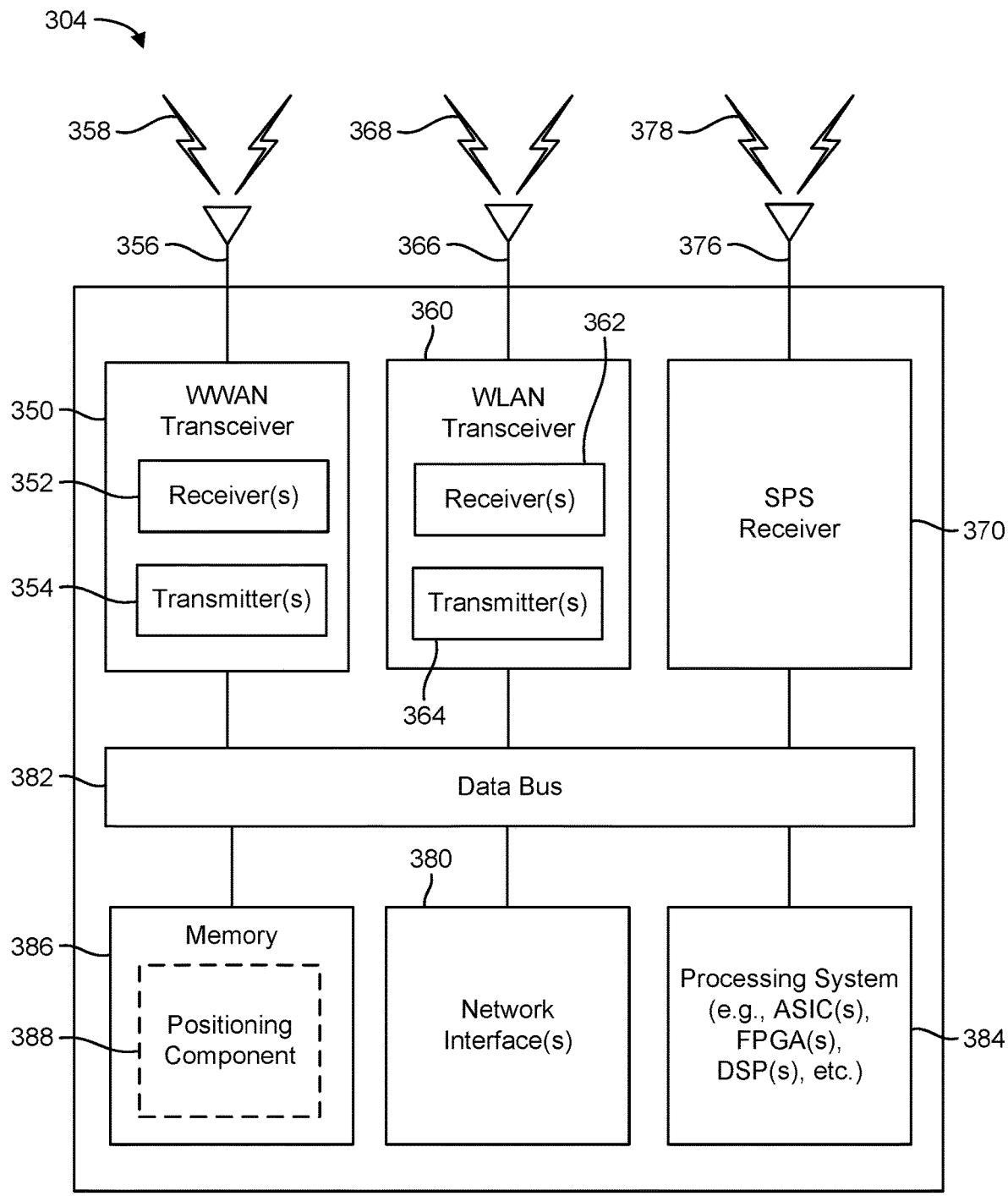
Figure 3C:
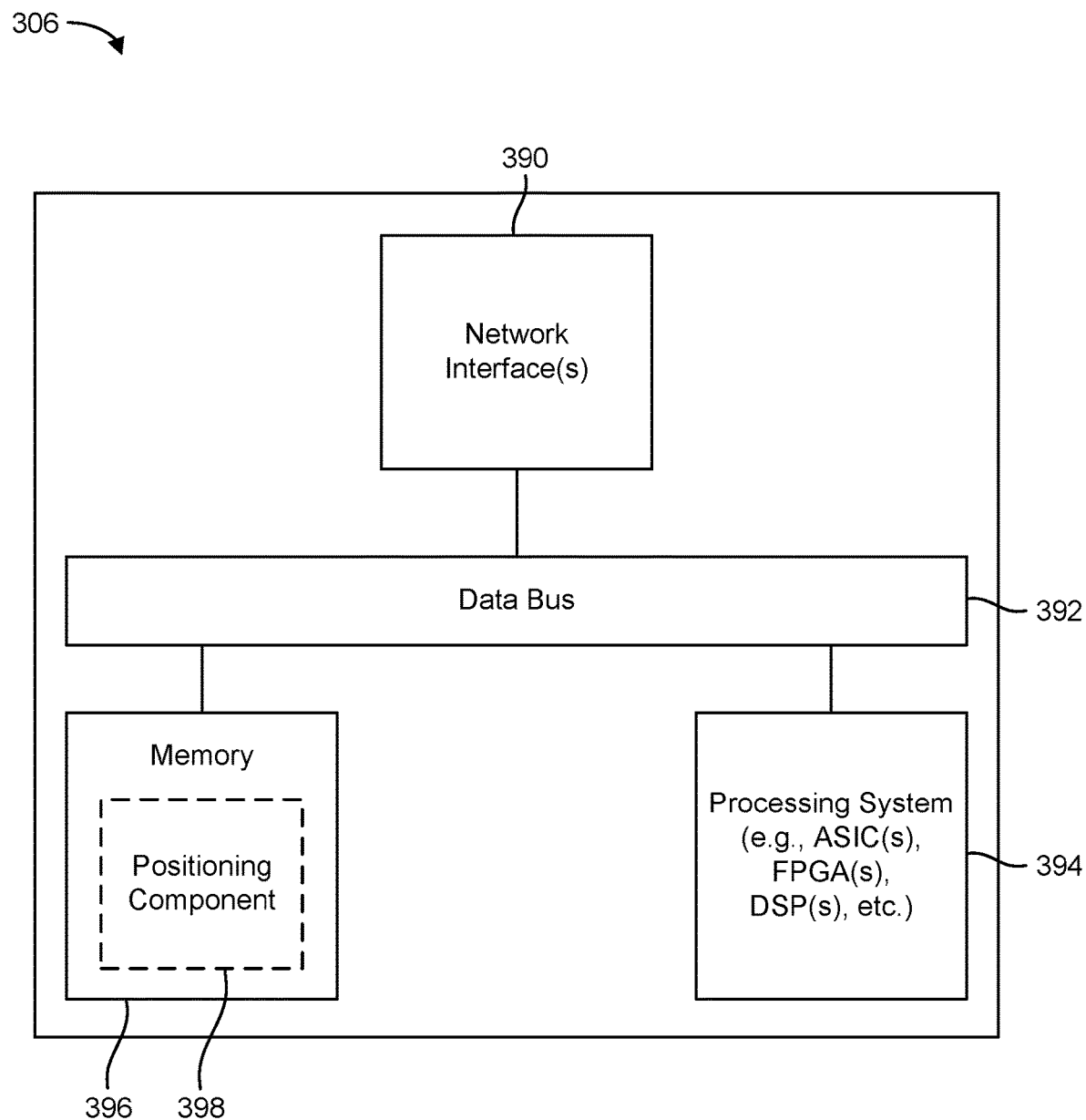

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
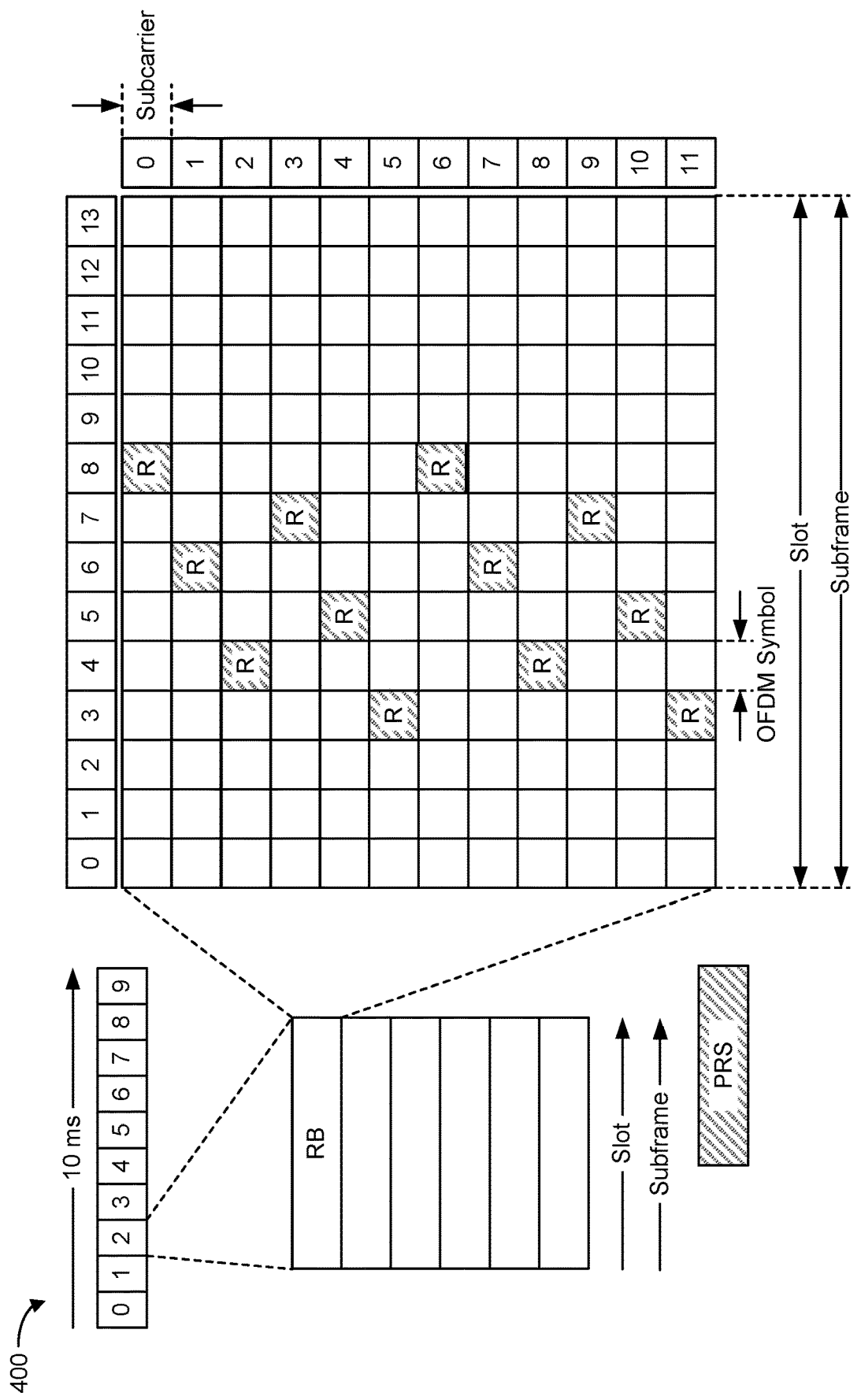
FIGS. 4A to 4D are diagrams illustrating examples of frame structures and channels within the frame structures, according to aspects of the disclosure.
Figure 4B:
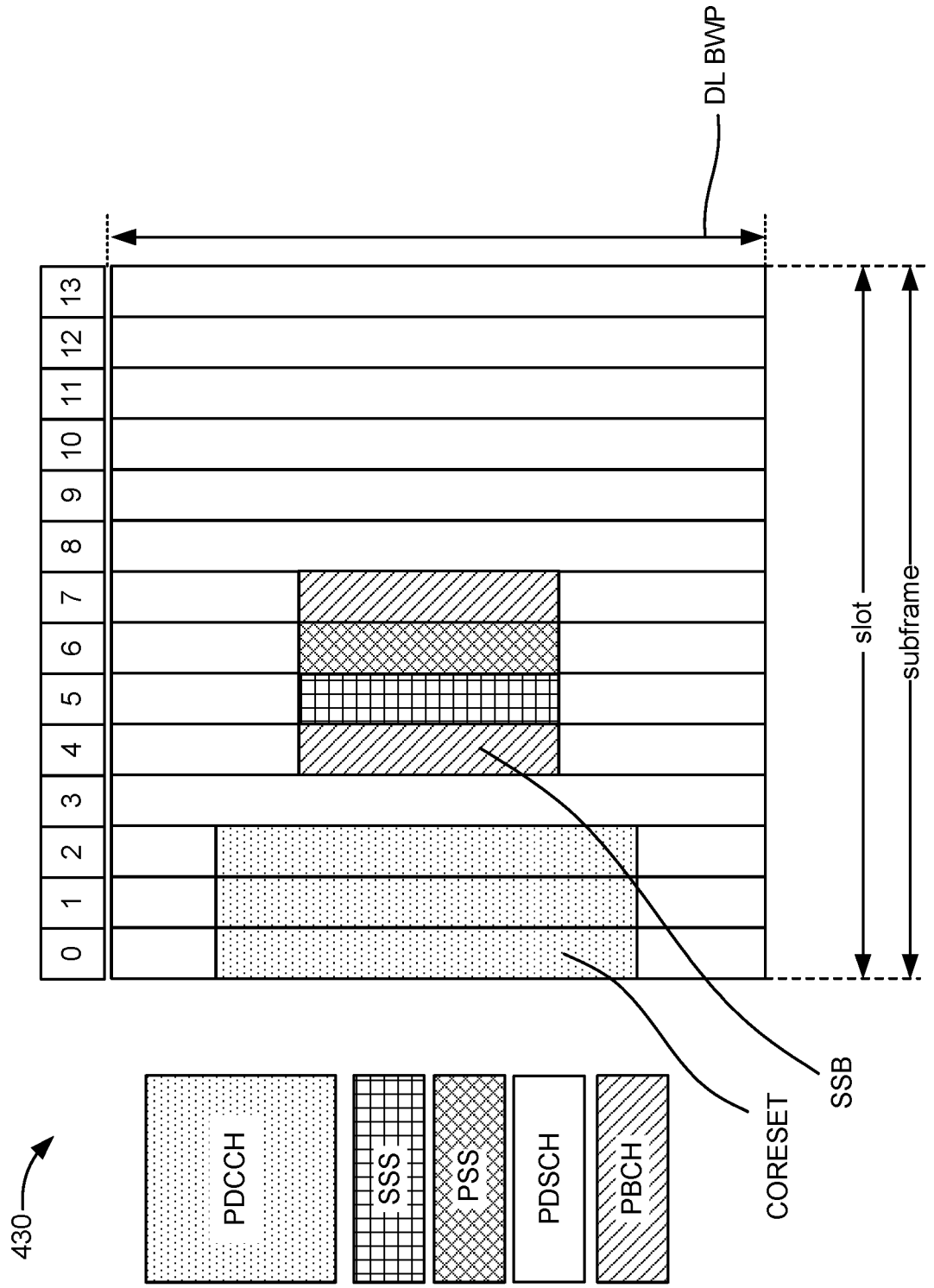
Figure 4C:
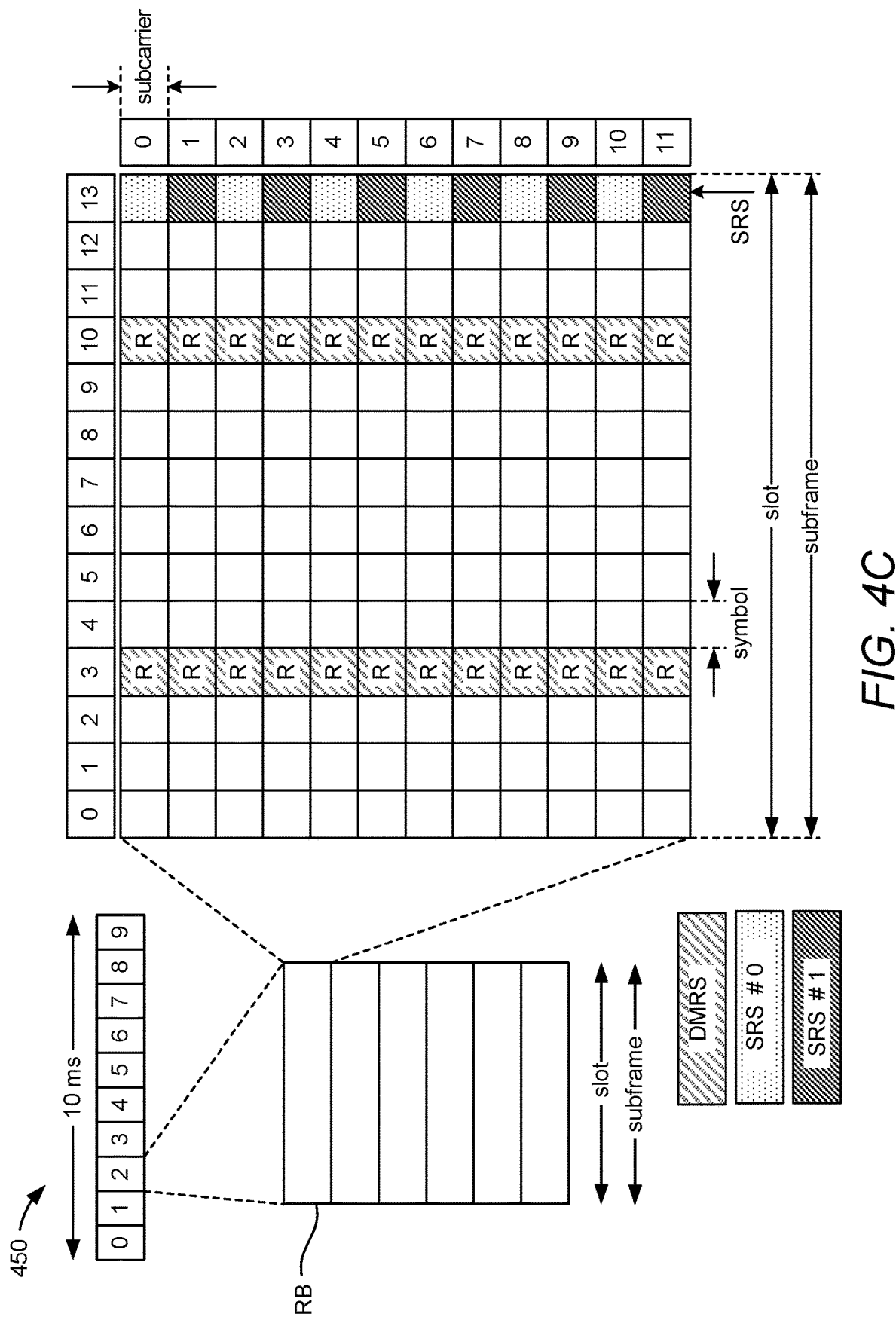
Figure 4D:
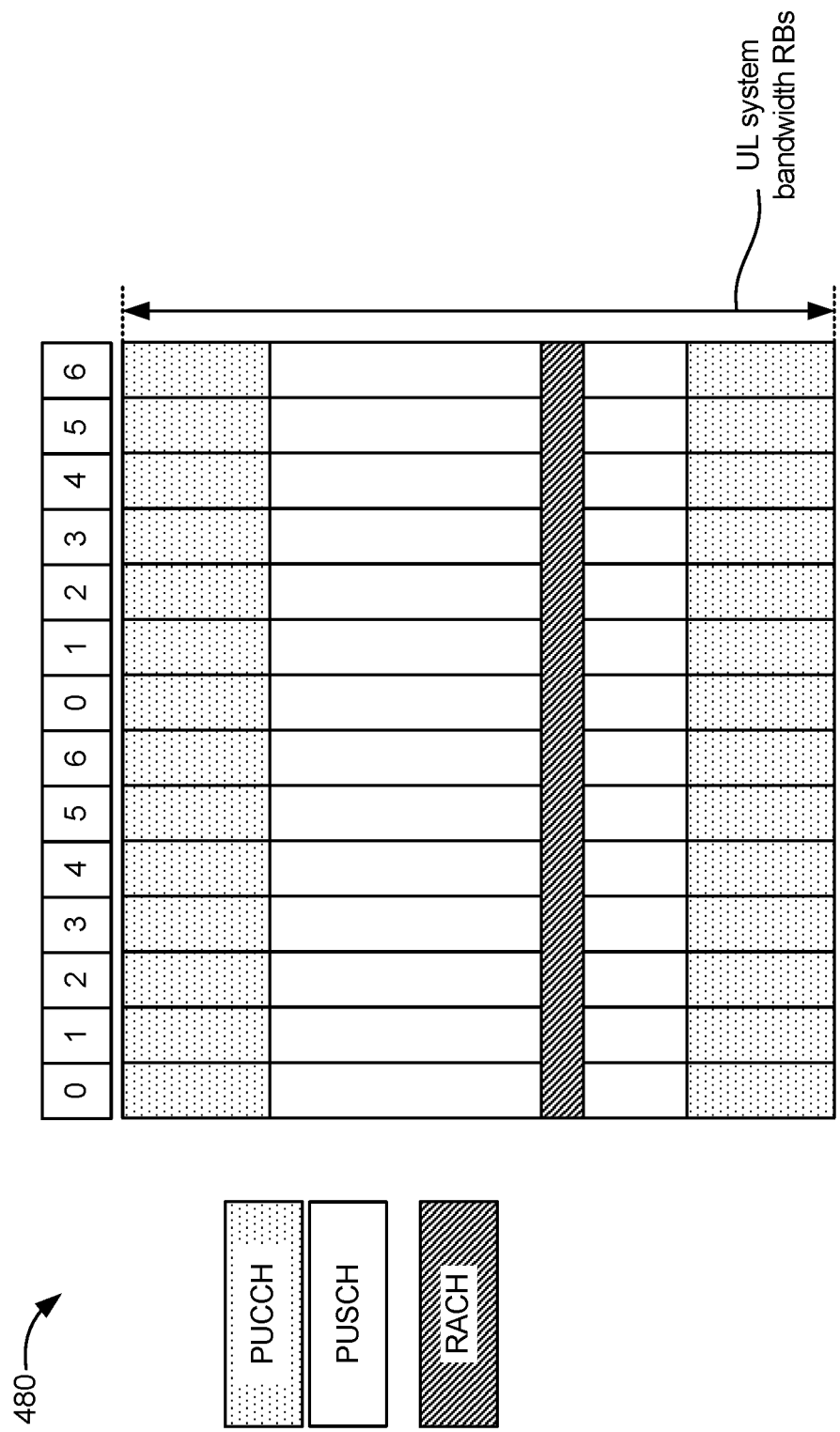

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 550 illustrating an example of an uplink frame structure, according to aspects of the disclosure. FIG. 4D is a diagram 580 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | scs (kHz) | Symbols/ Sot | Slots/ Sub-frame | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A to 4D, a numerology of 15 kHz is used. Thus, in the time domain, a frame (e.g., 10 ms) is divided into 10 equally sized subframes of 1 ms each, and each subframe includes one time slot. In FIGS. 4A to 4D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS in LTE, NRS in 5G, TRS, PTRS, CRS, CSI-RS, DMRS, PSS, SSS, SSB, etc. FIG. 4A illustrates exemplary locations of REs carrying PRS (labeled "R").

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fours symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance", a "positioning occasion," "a positioning instance," or simply an "occasion" or "instance."

FIG. 4B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

As illustrated in FIG. 4C, some of the REs carry DMRS for channel estimation at the base station. The UE may additionally transmit SRS in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4C, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 4D illustrates an example of various channels within an uplink subframe of a frame, according to aspects of the disclosure. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS can also be used as uplink positioning reference signals for uplink positioning procedures, such as uplink time-difference of arrival (UL-TDOA), multi-round-trip-time (multi-RTT), downlink angle-of-arrival (DL-AoA), etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLoss-Reference are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There may also be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS in LTE, NRS in 5G, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

The following parameters are used to configure DL-PRS resources and DL-PRS resource sets. The parameter "DL-PRS-Periodicity" defines the DL-PRS resource periodicity and takes the values of $T_{per}^{PRS} \in \{4, 5, 8, 10, 16, 20, 32, 40, 64, 80, 160, 320, 640, 1280, 2560, 5120, 10240, 20480\}$, where the value 20480 is not supported for $\mu=0$. All of the DL-PRS resources within one resource set are configured with the same periodicity. The parameter "DL-PRS-ResourceRepetitionFactor" defines how many times each DL-PRS resource is repeated for a single instance of the DL-PRS resource set and takes the values of $T_{rep}^{PRS} \in \{1,2,4,6,8, 16,32\}$. All of the DL-PRS resources within one resource set have the same "ResourceRepetitionFactor." The parameter "DL-PRS-ResourceTimeGap" defines the offset in number of slots between two repeated instances of a DL-PRS resource with the same DL-PRS-ResourceID within a single instance of the DL-PRS resource set, and takes the values of $T_{gap}^{PRS} \in \{1,2,4,8,16,32\}$. The UE only expects to be configured with the "DL-PRS-ResourceTimeGap" if the "DL-PRS-ResourceRepetitionFactor" is configured with a value greater than one. The time duration spanned by one instance of a "DL-PRS-ResourceSet" is not expected to exceed the configured value of "DL-PRS-Periodicity." All of the DL-PRS resources within one resource set have the same "DL-PRS-ResourceTimeGap." The parameter "DL-PRS-SFN0-Offset" defines the time offset of the SFN 0 slot 0 for the transmitting cell with respect to SFN 0 slot 0. The parameter "DL-PRS-ResourceSetSlotOffset" defines the slot offset with respect to SFN 0 slot 0 and takes values $T_{offset}^{PRS} \in \{0,1, \ldots, T_{per}^{PRS}-1\}$.

A PRS resource is defined by the following parameters. The parameter "DL-PRS-ResourceList" determines the DL-PRS resources that are contained within one DL-PRS resource set. The parameter "DL-PRS-ResourceId" identifies a specific DL-PRS resource. All DL-PRS resource identifiers are locally defined within a DL-PRS resource set. The parameter "DL-PRS-SequenceId" is used to initialize the $c_{init}$ value used in a pseudo-random generator for generation of DL-PRS sequences for a given DL-PRS resource. The parameter "DL-PRS-ReOffset" defines the starting RE offset of the first symbol within a DL-PRS resource in the frequency domain. The relative RE offsets of the remaining symbols within a DL-PRS resource are defined based on the initial offset and one or more rules. The parameter "DL-PRS-ResourceSlotOffset" determines the starting slot of the DL-PRS resource with respect to the corresponding "DL-PRS-ResourceSetSlotOffset." The parameter "DL-PRS-ResourceSymbolOffset" determines the starting symbol of the DL-PRS resource within the starting slot. The parameter "DL-PRS-NumSymbols" defines the number of symbols of the DL-PRS resource within a slot. The parameter "DL-PRS-QCL-Info" defines any quasi-colocation information of the DL-PRS resource with other reference signals. The DL-PRS may be configured to be 'QCL-Type-D' with a DL-PRS or SS/PBCH block from a serving cell or a non-serving cell. The DL-PRS may be configured to be 'QCL-Type-C' with an SS/PBCH block from a serving or non-serving cell. The parameter "DL-PRS-ResourceBandwidth" defines the number of resource blocks configured for PRS transmission. The parameter has a granularity of four PRBs with a minimum of 24 PRBs and a maximum of 272 PRBs. All DL-PRS resources within a DL-PRS resource set have the same value of "DL-PRS-ResourceBandwidth." The parameter "DL-PRS-StartPRB" defines the starting PRB index of the DL-PRS resource with respect to reference Point A. The starting PRB index has a granularity of one PRB with a minimum value of zero and a maximum value of 2176 PRBs.

Figure 5:
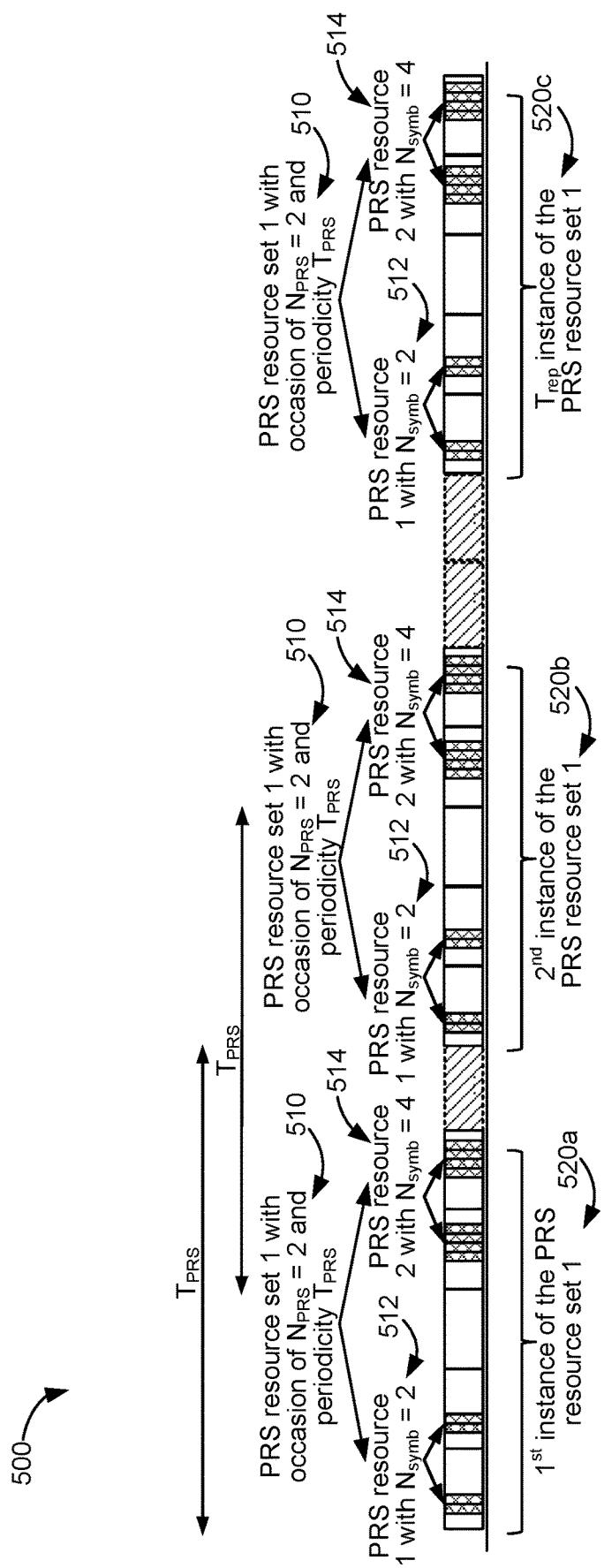
FIG. 5 illustrates an exemplary positioning reference signal (PRS) configuration for a cell supported by a wireless node.

FIG. 5 is a diagram of an exemplary PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. The PRS configuration 500 identifies the PRS resources 512 and 514 of a PRS resource set 510 during which the base station transmits PRS. The PRS resource set 510 has an occasion length $N_{PRS}$ of two (2) slots and a periodicity of $T_{PRS}$ (e.g., 160 subframes or 160 ms). As such, both the PRS resources 512 and 514 are two consecutive slots in length and repeat every $T_{PRS}$ subframes, starting from the slot in which the first symbol of the respective PRS resource occurs.

In the example of FIG. 5, the PRS resource set 510 includes two PRS resources, a first PRS resource 512 (labeled "PRS resource 1" in FIG. 5) and a second PRS resource 514 (labeled "PRS resource 2" in FIG. 5). The PRS resource 512 and the PRS resource 514 may be transmitted on separate beams of the same base station. The PRS resource 512 has a symbol length $N_{symb}$ of two (2) symbols, and the PRS resource 514 has a symbol length $N_{symb}$ of four (4) symbols.

Each instance of the PRS resource set 510, illustrated as instances 520a, 520b, and 520c, includes an occasion of length '2' (i.e., $Np_{PRS}s=2$) for each PRS resource 512, 514 of the PRS resource set. The PRS resources 512 and 514 are repeated every $T_{PRS}$ subframes up to the muting sequence periodicity $T_{REP}$. As such, a bitmap of length $T_{REP}$ would be needed to indicate which occasions of instances 520a, 520b, and 520c are muted.

PRS, and other types of positioning reference signals, are used for a number of cellular network-based positioning technologies. Such positioning technologies include downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, PTRS, CSI-RS, SSB, etc.) received from pairs of base stations, referred to as reference signal time difference (RSTD) or time difference of arrival (TDOA) measurements, and reports them to a positioning entity (e.g., the UE, a location server, a serving base station, or other network component). More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

It has been agreed to limit the maximum number of DL-PRS resources configured to the UE across all TRPs within a defined measurement window. That is, the TRPs involved in a positioning session with a particular UE will configure PRS resources for the UE (at the direction of the location server, such location server 230, LMF 270, SLP 272) such that all of the configured PRS resources are scheduled within a given measurement window. The length (i.e., duration) of the measurement window and the maximum number of PRS resources may be a UE capability that the UE signals to the location server via, for example, LTE positioning protocol (LPP).

Each TRP may configure one or more PRS resource sets in each configured PRS instance (or PRS occasion), and each PRS instance may begin at some slot offset from the start of an SFN and occurs at the PRS periodicity (i.e., $T_{PRS}$). The measurement window occurs with the same periodicity as the PRS periodicity and begins at the same slot offset. The slot offset for a DL-PRS resource set may be configured to the UE using a DL-PRS resource set offset parameter. The DL-PRS resource set offset parameter (i.e., "DL-PRS-ResourceSetSlotOffset") defines the slot offset with respect to the first slot of an SFN (i.e., slot "0") for a TRP where the DL-PRS resource set is configured. That is, the DL-PRS resource set slot offset parameter indicates the slot in which the first DL-PRS resource of the first DL-PRS resource set of the PRS instance occurs. The DL-PRS resource set offset parameter may have a value from 0 to a maximum resource offset value parameter (which is less than the periodicity $T_{PRS}$).

The PRS periodicity parameter indicates the periodicity of DL-PRS resource allocations in slots configured per the DL-PRS resource set. That is, all of the DL-PRS resources of a given PRS resource set have the same periodicity. In an aspect, the value of the PRS periodicity parameter may be selected from the set {4, 5, 8, 10, 16, 20, 32, 40, 64, 80, 160, 320, 640, 1280, 2560, 5120, 10240, 20480}. Note that a periodicity of 20480 is not supported for a subcarrier spacing (SCS) of 15 kHz.

A UE may also be configured with one or more SRS resource sets. An SRS resources may be defined by a resource type parameter and a periodicity and offset parameter. The resource type parameter specifies the type of SRS resources as periodic, semi-persistent, or aperiodic. The periodicity and offset parameter specifies the periodicity and offset for semi-persistent and periodic SRS resources. All values may be provided in terms of a "number of slots." Thus, for example, a value of "sl1" corresponds to a periodicity of one slot, a value of "sl2" corresponds to a periodicity of two slots, and so on. For each periodicity, the corresponding offset is given in the number of slots. For periodicity "sl1," for example, the offset is 0 slots.

Figure 6:
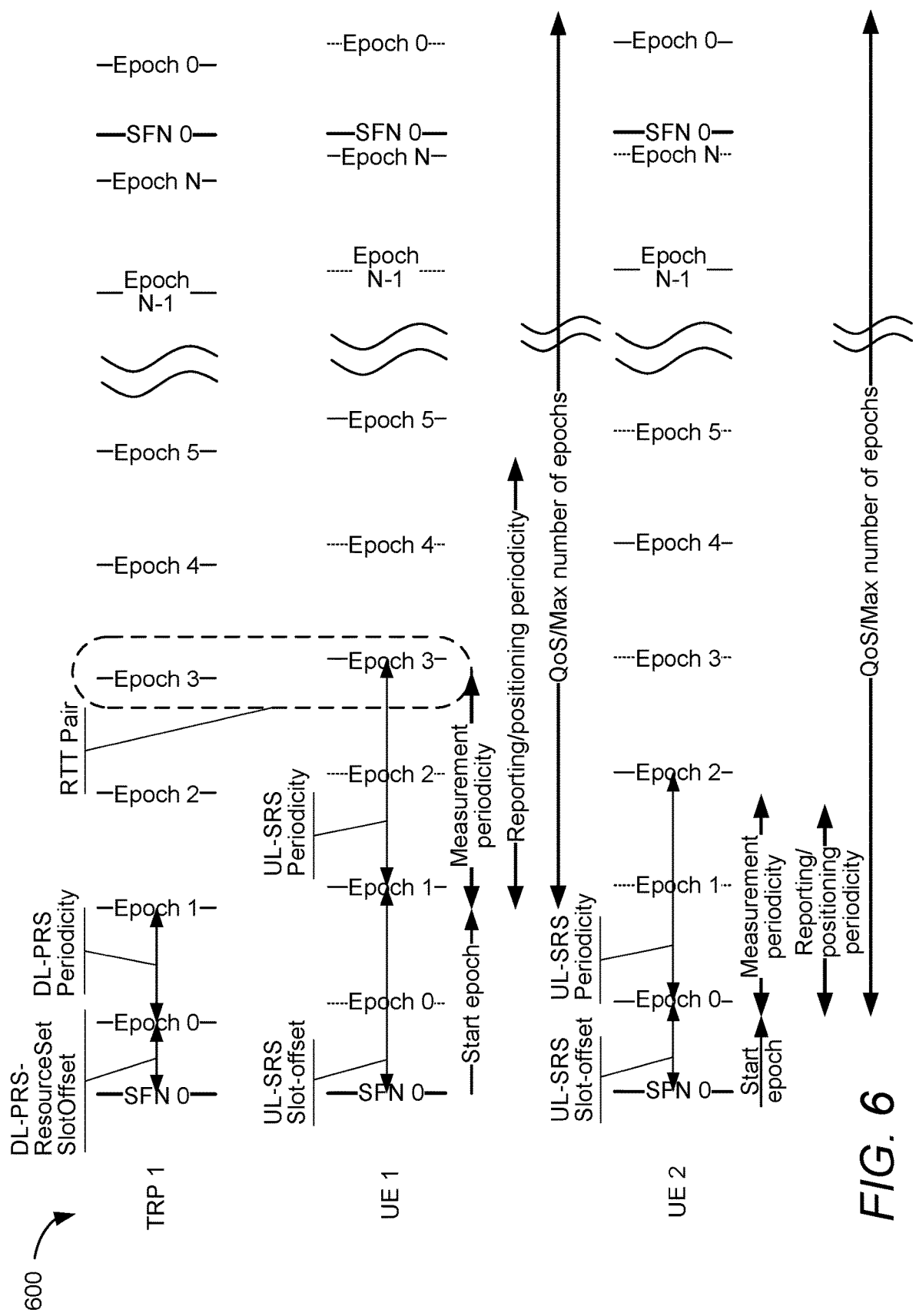
FIG. 6 is a diagram of downlink PRS transmissions and uplink PRS transmissions between a base station and two UEs, according to aspects of the disclosure.

FIG. 6 is a diagram 600 of DL-PRS transmissions and UL-PRS transmissions between a TRP (labelled "TRP 1") and two UEs (labelled "UE 1" and "UE 2"), according to aspects of the disclosure. Each epoch illustrated in FIG. 6 (e.g., "Epoch 0," "Epoch 1," etc.) corresponds to either a downlink or uplink PRS instance (PRS occasion) during which the transmitter (TRP 1, UE 1, or UE 2) transmits PRS on the PRS resources of one or more PRS resource sets.

At TRP 1, the time between the start of an SFN (labelled "SFN 0") and the first PRS transmission epoch (labelled "Epoch 0") is specified by the DL-PRS resource set slot offset parameter "DL-PRS-ResourceSetSlotOffset." The time between each PRS transmission epoch (e.g., "Epoch 0" and "Epoch 1") is specified by the DL-PRS periodicity parameter "DL-PRS-Periodicity."

At the first UE, i.e., UE 1, the time between the start of the SFN (i.e., "SFN 0") and the first SRS transmission epoch ("Epoch 1") is specified by the uplink SRS slot offset parameter "UL-SRS-SlotOffset." The time between each SRS transmission epoch (e.g., "Epoch 1" and "Epoch 3") is specified by the uplink SRS periodicity parameter "UL-SRS-Periodicity." The time between each SRS transmission epoch is also referred to as the measurement periodicity.

At the second UE, i.e., UE 2, the time between the start of the SFN (i.e., "SFN 0") and the first SRS transmission epoch ("Epoch 0") is specified by the uplink SRS slot offset parameter "UL-SRS-SlotOffset." The time between each SRS transmission epoch (e.g., "Epoch 0" and "Epoch 2") is specified by the uplink SRS periodicity parameter "UL-SRS-Periodicity." The time between each SRS transmission epoch is also referred to as the measurement periodicity.

In the example of FIG. 6, the TRP 1 can support multiple UEs (UE 1 and UE 2) using a time division multiplexing (TDM) approach. That is, as shown, UE 1 transmits SRS at "Epoch 1" and "Epoch 3," and UE 2 transmits SRS at "Epoch 0" and "Epoch 2." An epoch pair, such as Epoch 3 at TRP 1 and Epoch 3 at UE 1, form an RTT pair (i.e., an RTT measurement signal and an RTT response signal).

Note that the maximum number of epochs per SFN ("N") is based on the QoS of the location estimate, with more epochs resulting in higher positioning accuracy.

Ideally, all measurements that go into generating a location fix should be made concurrently. If measurements from different points in time are used for generating a location fix, UE motion, as well as changes to UE and base station clocks (referred to as "clock drift"), can result in measurement errors that ultimately could produce location errors. For example, travel at a highway speed of 30 meters per second (m/s) could result in a 30 meter (m) (i.e., 1 s*30 m/s=30 m) measurement error if two measurements were made 1 second apart. Similarly, a 10 part-per-billion UE clock drift could produce a 10 nanosecond (ns) (i.e., 1 s*10 ns/s=10 ns), approximately 3 m, measurement error for two measurements taken one second apart. With the stricter 3 m to 10 m accuracy targets for commercial use cases in NR, it is important that controllable error sources (unlike, e.g., multipath) are minimized.

With regard to multi-cell RTT, it is beneficial to conduct and associate as close in time as possible the Rx-Tx offset measurements produced by the UE with the Tx-Rx offset measurements produced by the corresponding TRPs (where the TRPs transmit the RTT measurement signals and the UE transmits the RTT response signals). Referring back to FIG. 6, this figure shows an example of an RTT pair where the DL-PRS transmission from TRP 1 and the SRS transmission from UE 1 are scheduled close in time, that is, at Epoch 5 (the reporting/positioning periodicity).

Continuing the example in FIG. 6, DL-PRS transmission is scheduled in various instances (epochs) according to the parameters "DL-PRS-ResourceSetSlotOffset" and "DL-PRS-Periodicity." Similarly, SRS can be scheduled in instances (epochs) according to the parameters "SRS-SlotOffset" and "SRS-Periodicity." However, keeping with the on-demand nature of NR, there may be a start instance that specifies the first time during a session that SRS will be transmitted by a given UE (e.g., UE 1 or UE 2). The start of SRS transmission for positioning may, for example, be given by an SRS activation command. Likewise, a session may be limited in time by a given QoS or by the transmission of an SRS deactivation command.

For simplicity, the SRS instances (epochs) are numbered according to the closest DL-PRS instance (epoch). Note that a corresponding SRS instance can appear before or after the DL-PRS instance in an RTT pair. In FIG. 6, this is referred to as the DL-to-UL offset. Furthermore, different UEs may utilize different sets of SRS instances. The large-scale (inter-instance) and small-scale (intra-instance) TDM provides opportunities to support more UEs while minimizing signal congestion/interference on the radio link and reducing peak processing load requirements on the base stations (e.g., gNBs).

Currently, as noted above, all DL-PRS resources configured to the UE across all TRPs are scheduled within a measurement window. The present disclosure proposes to configure, for a given UE involved in a positioning session (e.g., multi-RTT), all DL-PRS resources across all involved TRPs and all UL-PRS (or SRS) resources to be within the same measurement/transmission window. In that way, the UE expects the "SRS-Slot-offset" and "SRS-Periodicity" parameters to be configured in an SRS-for-positioning resource such that any SRS transmission is within [−X, X] ms of at least one DL-PRS resource from each of the TRPs. For example, X may be 25 ms. Such an RS configuration may enable sufficiently close measurements in time at both the UE and TRPs.

In an aspect, a limit on the maximum number of UL-PRS resources configured to the UE for all TRPs within the measurement/transmission window may be defined. This limit can be signalled by the UE (e.g., to the location server over LPP) as a UE capability. In an aspect, the UE may report a different maximum length based on the frequency range (e.g., FR1, Fr2) in which the UE is operating, or the frequency band in which the UE is operating, etc.

Figure 7:
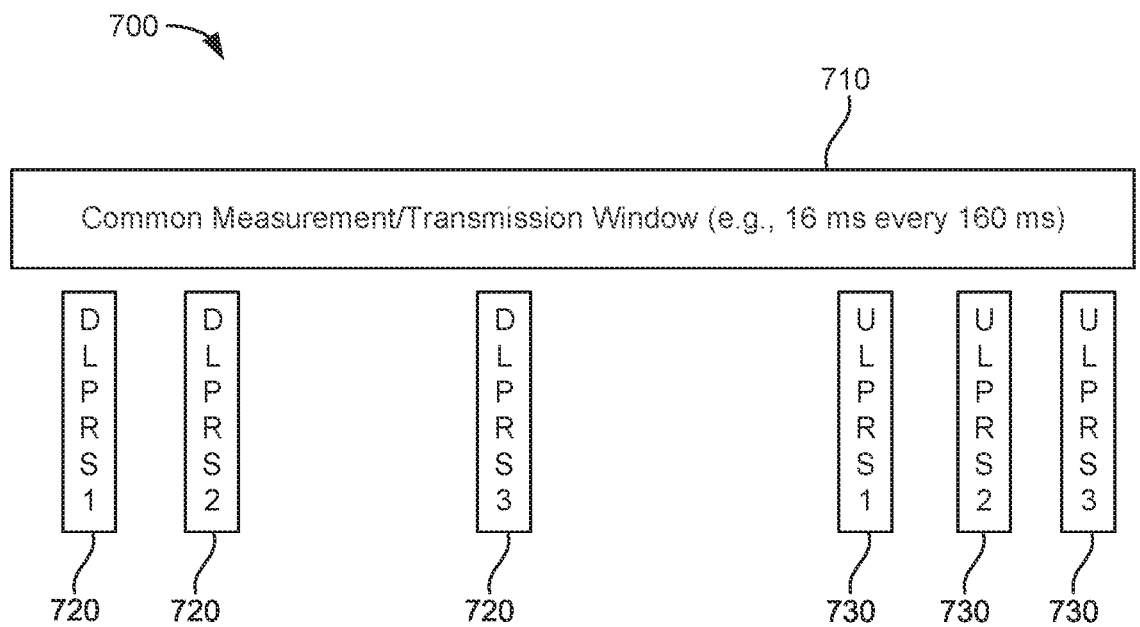
FIG. 7 is a diagram of a common measurement/transmission window during which both downlink PRS resources and uplink PRS resources are scheduled for a given UE, according to aspects of the disclosure.

FIG. 7 is a diagram 700 of a common measurement/transmission window 710 during which both DL-PRS resources 720 and UL-PRS resources 730 are scheduled for a given UE, according to aspects of the disclosure. In the example of FIG. 7, the measurement/transmission window 710 is 16 ms in length and occurs every 160 ms. However, as will be appreciated, this is merely an example, and numerous other configurations of the measurement/transmission window 710 are possible.

The DL-PRS transmissions on the DL-PRS resources 720 and the UL-PRS transmissions on the UL-PRS resources 730 within the measurement/transmission window 710 are not necessarily related to each other. That is, while the UL-PRS resources 730 may be for transmitting UL-PRS in response to DL-PRS measured on the DL-PRS resources 720, this may not always be the case. For example, at least some of the DL-PRS resources 720 and UL-PRS resources 730 may be for different positioning sessions. For example, the DL-PRS resources 720 may be for one type of positioning session (e.g., DL-TDOA) and the UL-PRS resources 730 may be for a different type of positioning session (e.g., UL-TDOA).

In addition, while FIG. 7 illustrates the UL-PRS resources 730 following the DL-PRS resources 720, because they are not necessarily related to each other, they can occur in any order, and can even be interspersed with each other. Further, although FIG. 7 illustrates three DL-PRS resources 720 and three UL-PRS resources 730, as will be appreciated, there may be more or fewer than three each, and there may be different numbers of DL-PRS resources 720 and UL-PRS resources 730.

The length/duration and periodicity of the measurement/transmission window 710 may not be explicitly signaled to the UE. Rather, it is implicit based on the configuration of the DL-PRS resources 720 and UL-PRS resources 730. More specifically, the location server (e.g., location server 230, LMF 270, SLP 272) may configure DL-PRS resources 720 for the UE within the measurement/transmission window 710, and configure the UE with UL-PRS resources 730 within the same measurement/transmission window 710. The length/duration of the measurement/transmission window 710 is therefore from the first DL-PRS resource 720 or UL-PRS resource 730 of a PRS instance (here, DL-PRS resource 720, labeled "DL-PRS 1") to the last DL-PRS resource 720 or UL-PRS resource 730 of the PRS instance (here, UL-PRS resource 730, labeled "UL-PRS 3"). As described above, the first downlink or uplink PRS resource of a PRS instance starts at the slot offset (as specified in either the DL-PRS resource set slot offset or the UL-PRS slot offset parameter). The last downlink or uplink PRS resource of the PRS instance occurs before the end of the PRS periodicity, at which point, a new PRS instance and measurement/transmission window 710 begins, and may correspond to the maximum resource offset value. Thus, the measurement/transmission window 710 may be roughly commensurate with a downlink or uplink PRS instance, except that it includes both downlink and uplink PRS resources during the same time period, meaning that both the downlink and uplink PRS instances have the same periodicity. That is, all DL-PRS resources across all TRPs and all UL-PRS resources are scheduled within the same window every DL-PRS periodicity, which is equal with the UL-PRS periodicity.

In an aspect, the duration of the measurement/transmission window 710 may always be a fraction of the periodicity (i.e., $Tp_{PRS}$). For example, the duration may correspond to the range ["DL-PRS-ResourceSetSlotOffset," "DL-PRS-ResourceSetSlotOffset"+$T_{PRS}/10$], or the range ["DL-PRS-ResourceSetSlotOffset"−$T_{PRS}/10$, "DL-PRS-ResourceSetSlotOffset"+$T_{PRS}/10$]. The selected/calculated duration may be rounded up to the next slot/subframe boundary. For example, if $Tp_{PRS}=5$ ms, then $T_{PRS}/10=0.5$ ms, so the duration can be rounded up to the range ["DL-PRS-ResourceSetSlotOffset"−1, "DL-PRS-ResourceSetSlotOffset"+1] ms.

In an aspect, for small periodicities (i.e., less than a threshold), the duration of the measurement/transmission window 710 may be equal to the periodicity, but for larger periodicities (i.e., greater than the threshold), the duration of the measurement/transmission window 710 may be smaller than the periodicity. For example, the threshold may be a periodicity of 32 slots or 32 ms.

In an aspect, the measurement/transmission window 710 may correspond to a DL-PRS measurement window, the parameters for which were described above. In that case, the location server may simply schedule all UL-PRS resources for the UE to be within the DL-PRS measurement window.

In an aspect, although the length of the measurement/transmission window 710 may not be signaled to the UE, the UE may signal (to the location server via LPP) the length of the measurement/transmission window 710 as a UE capability, the same as it may signal the length of the DL-PRS measurement window. The location server can then schedule the DL-PRS resources 720 and UL-PRS resources 730 within the signaled measurement/transmission window 710.

As described above, all UL-PRS (or SRS-for-positioning) resources for positioning may be transmitted within a common measurement/transmission window, which may correspond to a DL-PRS measurement window as currently defined. However, there may be multiple DL-PRS measurement windows defined, and the UL-PRS would need to be transmitted within those measurement windows. For example, instead of one DL-PRS measurement window in which all DL-PRS resource sets are expected to be received, there may be one DL-PRS measurement window per DL-PRS resource set. In that case, UL-PRS resources could be scheduled within those DL-PRS measurement windows, making them measurement/transmission windows as well.

Figure 8:
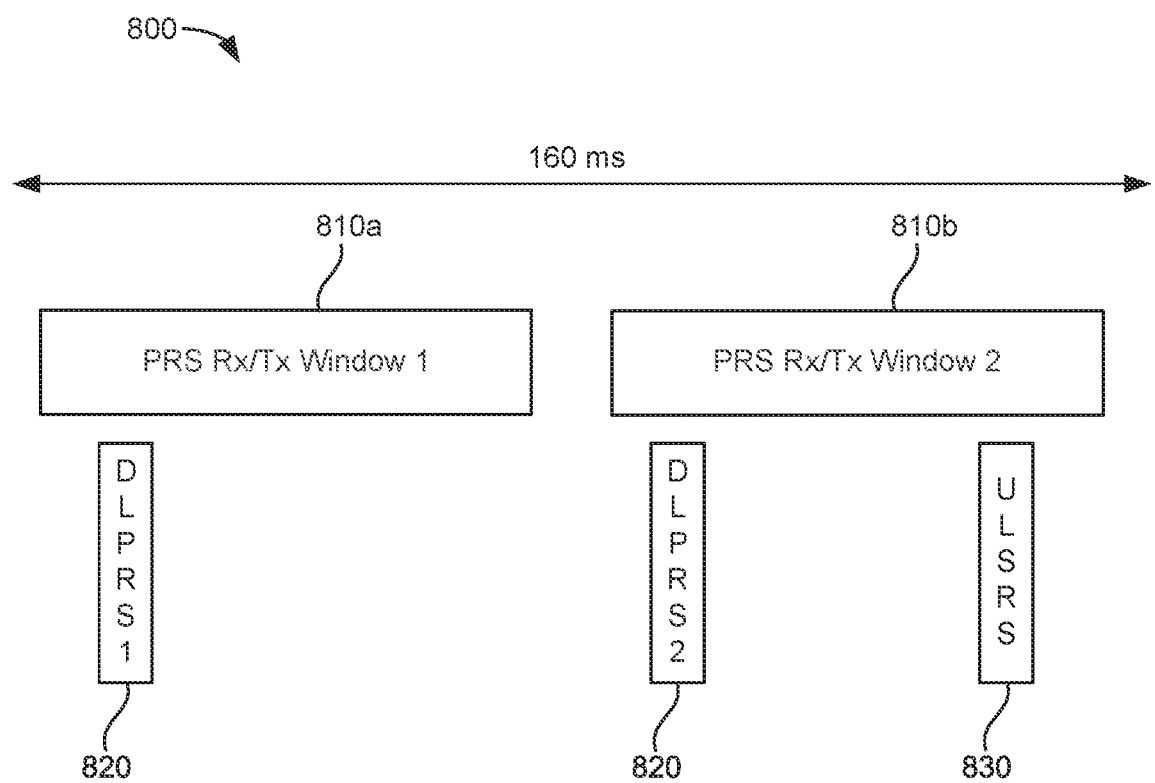
FIG. 8 is a diagram of multiple measurement/transmission windows during which both downlink PRS resources and uplink PRS resources are scheduled for a given UE, according to aspects of the disclosure.

FIG. 8 is a diagram 800 of multiple measurement/transmission windows 810 during which both DL-PRS resources 820 and UL-PRS resources 830 are scheduled for a given UE, according to aspects of the disclosure. In the example of FIG. 8, the first measurement/transmission window 810a includes a single DL-PRS resource 820 (meaning there is only one DL-PRS resource 820 in that DL-PRS resource set) and no UL-PRS resources 830. The second measurement/transmission window 810b also includes a single DL-PRS resource 820, but also includes an UL-PRS resource 830. As will be appreciated, this is merely an example, and there may be more or fewer DL and UL-PRS resources in the measurement/transmission windows 810.

There are various benefits of transmitting downlink and uplink PRS in the same measurement/transmission window. For example, a UE may experience some amount of clock drift, and as such, if the downlink and uplink PRS transmission(s) for a given positioning session are too far apart in time (e.g., outside the measurement/transmission windows), the clock may have drifted enough to affect measurement accuracy. As another example, if the UE is in motion, the change in location of the UE between the downlink and uplink PRS transmission(s) for a given positioning session may affect accuracy if the downlink and uplink PRS transmission(s) are outside of the same measurement/transmission window.

Figure 9:
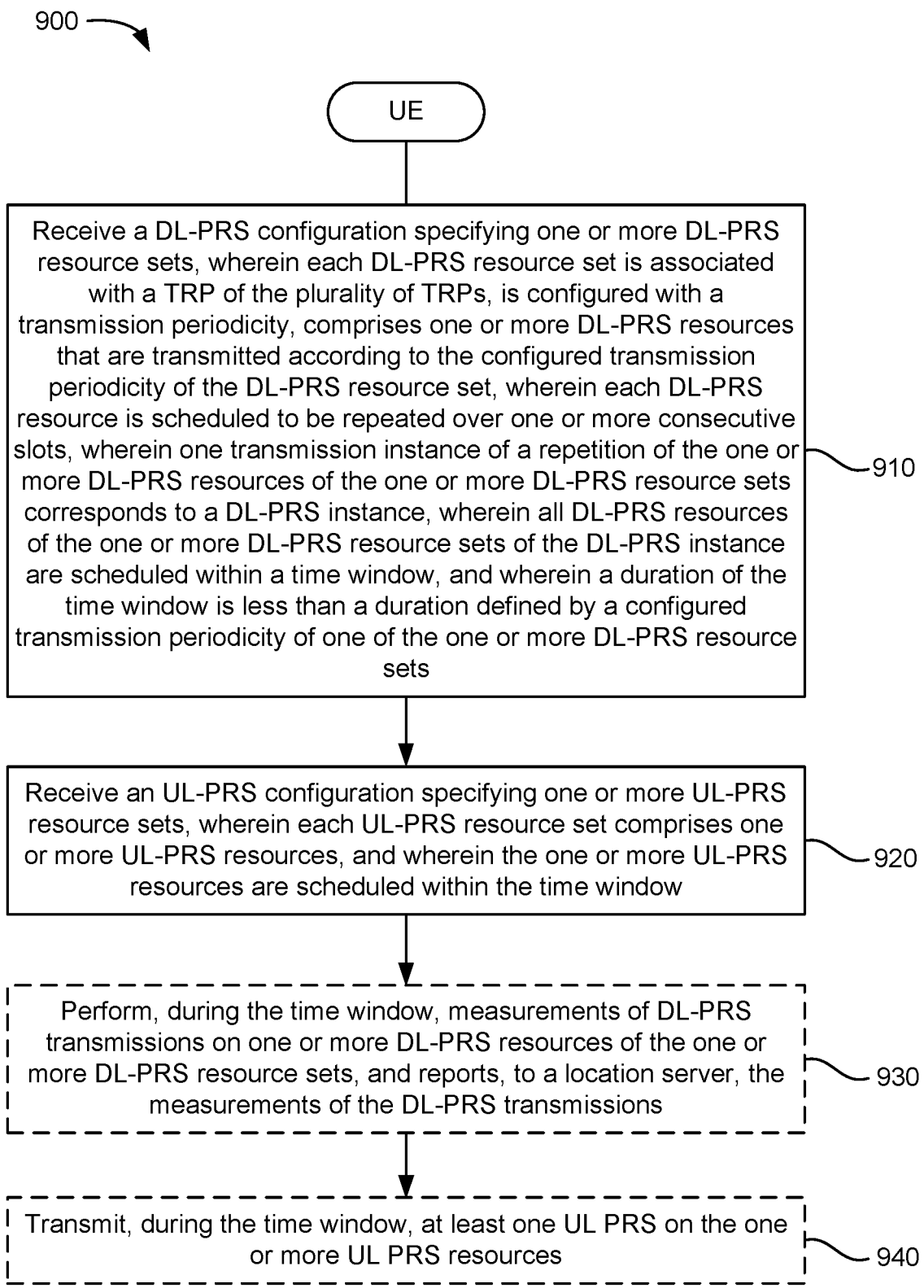
FIGS. 9 and 10 illustrate methods of wireless communication, according to aspects of the disclosure.

FIG. 9 illustrates an exemplary method 900 of wireless communication, according to aspects of the disclosure. The method 900 may be performed by a UE (e.g., any of the UEs described herein) engaged in a positioning session with a plurality of TRPs.

At 910, the UE receives a DL-PRS configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets. In an aspect, operation 910 may be performed by WWAN transceiver 310, processing system 332, memory component 340, and/or positioning component 342, any or all of which may be considered means for performing this operation.

At 920, the UE receives an UL-PRS configuration specifying one or more UL-PRS resource sets, wherein each UL-PRS resource set comprises one or more UL-PRS resources, and wherein the one or more UL-PRS are scheduled within the time window. In an aspect, operation 920 may be performed by WWAN transceiver 310, processing system 332, memory component 340, and/or positioning component 342, any or all of which may be considered means for performing this operation.

At 930, the UE optionally performs, during the time window, measurements of DL-PRS transmissions on one or more DL-PRS resources of the one or more DL-PRS resource sets, and reports, to a location server, the measurements of the DL-PRS transmissions. In an aspect, operation 930 may be performed by WWAN transceiver 310, processing system 332, memory component 340, and/or positioning component 342, any or all of which may be considered means for performing this operation.

At 940, the UE optionally transmits, during the time window, at least one UL-PRS on the one or more UL-PRS resources. In an aspect, operation 940 may be performed by WWAN transceiver 310, processing system 332, memory component 340, and/or positioning component 342, any or all of which may be considered means for performing this operation.

Figure 10:
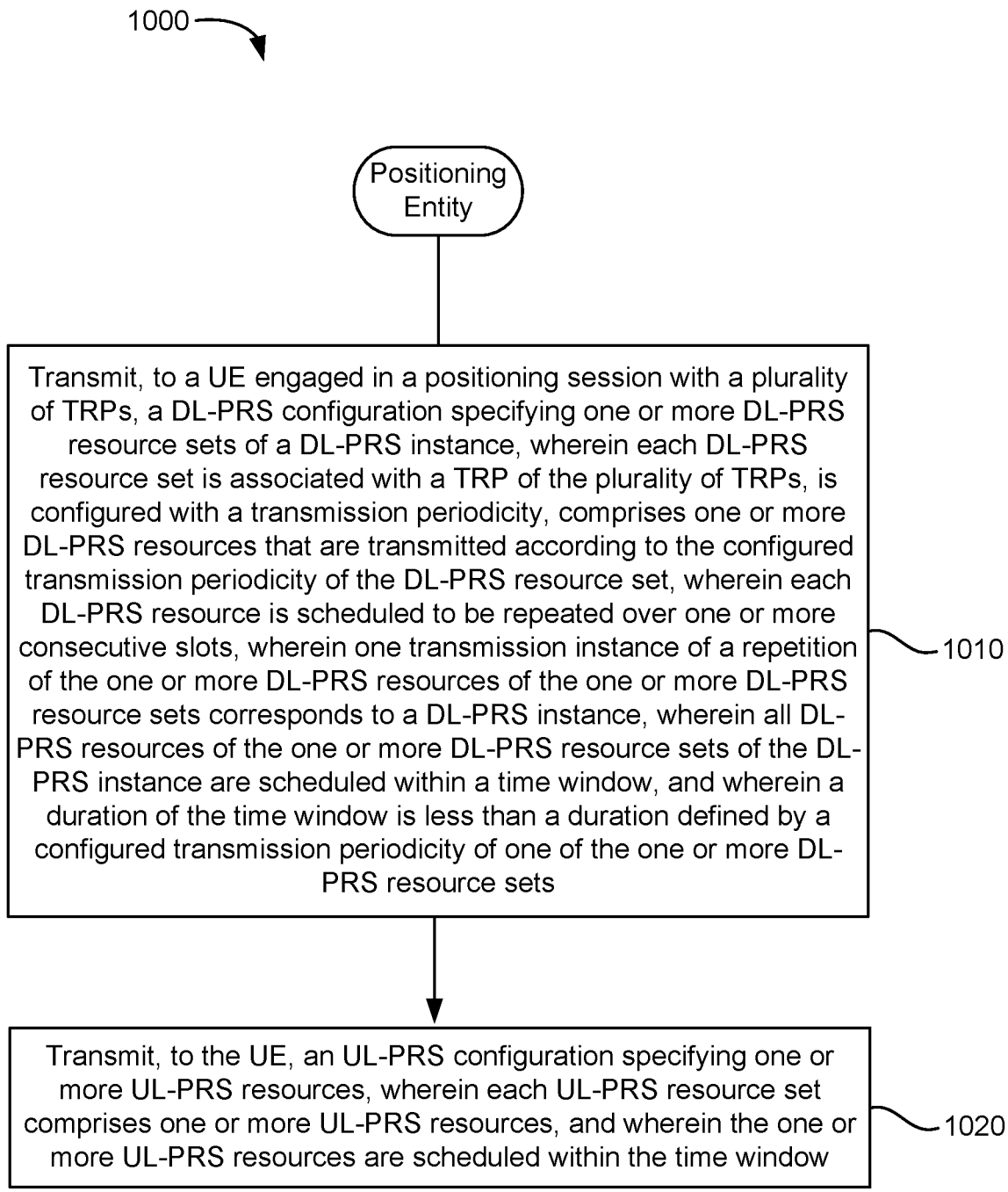

FIG. 10 illustrates an exemplary method 1000 of wireless communication, according to aspects of the disclosure. The method 1000 may be performed by a positioning entity, such as location server 230, LMF 270, or SLP 272.

At 1010, the positioning entity transmits, to a UE (e.g., any of the UEs described herein) engaged in a positioning session with a plurality of TRPs, a DL-PRS configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets. In an aspect, operation 1010 may be performed by network interface(s) 390, processing system 394, memory component 396, and/or positioning module 398, any or all of which may be considered means for performing this operation.

At 1020, the positioning entity transmits, to the UE, an UL-PRS configuration specifying one or more UL-PRS resource sets, wherein each UL-PRS resource set comprises one or more UL-PRS resources, and wherein the one or more UL-PRS are scheduled within the time window. In an aspect, operation 1020 may be performed by network interface(s) 390, processing system 394, memory component 396, and/or positioning module 398, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE) engaged in a positioning session with a plurality of transmission-reception points (TRPs), comprising:
    receiving a downlink positioning reference signal (DL-PRS) configuration specifying one or more DL-PRS resource sets, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and
    receiving an uplink PRS (UL-PRS) configuration specifying one or more UL-PRS resource sets, wherein each UL-PRS resource set comprises one or more UL-PRS resources, and wherein the one or more UL-PRS resources are scheduled within the time window.

2. The method of claim 1, further comprising:
    performing, during the time window, measurements of DL-PRS transmissions on one or more DL-PRS resources of the one or more DL-PRS resource sets.

3. The method of claim 1, further comprising:
    transmitting, during the time window, at least one UL-PRS on the one or more UL-PRS resources.

4. The method of claim 1, wherein a maximum duration of the time window is a UE capability, the method further comprising:
    transmitting, to a location server, the maximum duration of the time window.

5. The method of claim 1, wherein the duration of the time window is a fraction of a configured transmission periodicity of one of the one or more DL-PRS resource sets.

6. The method of claim 1, wherein all of the one or more DL-PRS resource sets have the same transmission periodicity.

7. The method of claim 1, wherein the duration of the time window is rounded up to a slot or subframe boundary.

8. The method of claim 1, wherein the duration of the time window is less than the duration defined by the configured transmission periodicity based on the duration defined by the configured transmission periodicity being greater than a threshold.

9. The method of claim 1, wherein the time window corresponds to a DL-PRS measurement window, the method further comprising:
    receiving a slot offset parameter that specifies a start slot for the one or more DL-PRS resource sets; and
    receiving a maximum resource offset value parameter that specifies a maximum number of the DL-PRS resources of the one or more DL-PRS resource sets of the DL-PRS instance.

10. The method of claim 1, further comprising:
    receiving a slot offset parameter that specifies a start slot for the one or more DL-PRS resource sets or the one or more UL-PRS resources; and receiving a maximum resource offset value parameter that specifies a maximum number of the DL-PRS resources of the one or more DL-PRS resource sets or a maximum number of the one or more UL-PRS resources.

11. The method of claim 1, wherein the time window is configured based on the UE being configured to report a UE reception-to-transmission (UE Rx-Tx) measurement.

12. The method of claim 1, wherein each of the DL-PRS resources of the one or more DL-PRS resource sets of the DL-PRS instance is associated with at least one of the one or more UL-PRS resources.

13. The method of claim 1, wherein at least some of the DL-PRS resources of the one or more DL-PRS resource sets of the DL-PRS instance are not associated with any of the one or more UL-PRS resources.

14. The method of claim 1, wherein the one or more DL-PRS resource sets of the DL-PRS instance are configured across all the plurality of TRPs.

15. The method of claim 1, wherein all of the one or more UL-PRS resources are scheduled within the time window.

16. The method of claim 1, wherein:
not all of the one or more UL-PRS resources are scheduled within the time window, and
based on not all of the one or more UL-PRS resources being scheduled within the time window, an accuracy requirement for the positioning session is less than an accuracy requirement for the positioning session when all of the one or more UL-PRS resources are scheduled within the time window.

17. The method of claim 2, further comprising:
reporting, to a location server, one or more of the measurements of the DL-PRS transmissions.

18. The method of claim 4, wherein the maximum duration of the time window is based on a frequency range or a frequency band to which the UE can tune.

19. A method of wireless communication performed by a positioning entity, comprising:
transmitting, to a user equipment (UE) engaged in a positioning session with a plurality of transmission-reception points (TRPs), a downlink positioning reference signal (DL-PRS) configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and
transmitting, to the UE, an uplink PRS (UL-PRS) configuration specifying one or more UL-PRS resource sets, wherein each UL-PRS resource set comprises one or more UL-PRS resources, and wherein the one or more UL-PRS resources are scheduled within the time window.

20. The method of claim 19, further comprising:
receiving, from the UE, one or more of measurements of DL-PRS transmissions on one or more DL-PRS resources of the one or more DL-PRS resource sets.

21. The method of claim 19, wherein a maximum duration of the time window is a UE capability, the method further comprising:
receiving, from the UE, the maximum duration of the time window.

22. The method of claim 19, wherein the duration of the time window is a fraction of a configured transmission periodicity of one of the one or more DL-PRS resource sets.

23. The method of claim 19, wherein all of the one or more DL-PRS resource sets have the same transmission periodicity.

24. The method of claim 19, wherein the duration of the time window is rounded up to a slot or subframe boundary.

25. The method of claim 19, wherein the duration of the time window is less than the duration defined by the configured transmission periodicity based on the duration defined by the configured transmission periodicity being greater than a threshold.

26. The method of claim 19, wherein the time window corresponds to a DL-PRS measurement window, the method further comprising:
transmitting, to the UE, a slot offset parameter that specifies a start slot for the one or more DL-PRS resource sets; and
transmitting, to the UE, a maximum resource offset value parameter that specifies a maximum number of the DL-PRS resources of the one or more DL-PRS resource sets of the PRS instance.

27. The method of claim 19, further comprising:
transmitting, to the UE, a slot offset parameter that specifies a start slot for the one or more DL-PRS resource sets or the one or more UL-PRS resources; and
transmitting, to the UE, a maximum resource offset value parameter that specifies a maximum number of the DL-PRS resources of the one or more DL-PRS resource sets or a maximum number of the one or more UL-PRS resources.

28. The method of claim 19, further comprising:
transmitting, to the plurality of TRPs, the DL-PRS configuration.

29. The method of claim 19, wherein the time window is configured based on the UE being configured to report a UE reception-to-transmission (UE Rx-Tx) measurement.

30. The method of claim 19, wherein each of the DL-PRS resources of the one or more DL-PRS resource sets of the DL-PRS instance is associated with at least one of the one or more UL-PRS resources.

31. The method of claim 19, wherein at least some of the DL-PRS resources of the one or more DL-PRS resource sets of the DL-PRS instance are not associated with any of the one or more UL-PRS resources.

32. The method of claim 19, wherein the one or more DL-PRS resource sets of the DL-PRS instance are configured across all the plurality of TRPs.

33. The method of claim 19, wherein all of the one or more UL-PRS resources are scheduled within the time window.

34. The method of claim 19, wherein:
not all of the one or more UL-PRS resources are scheduled within the time window, and
based on not all of the one or more UL-PRS resources being scheduled within the time window, an accuracy requirement for the positioning session is less than an accuracy requirement for the positioning session when all of the one or more UL-PRS resources are scheduled within the time window.

35. The method of claim 21, wherein the maximum duration of the time window is based on a frequency range or a frequency band to which the UE can tune.

36. A user equipment (UE), comprising:
a memory;
at least one transceiver; and
at least one processor communicatively coupled to the memory and the at least one transceiver, the at least one processor configured to:
receive, during a positioning session with a plurality of transmission-reception points (TRPs), via the at least one transceiver, a downlink positioning reference signal (DL-PRS) configuration specifying one or more DL-PRS resource sets, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and
receive, via the at least one transceiver, an uplink PRS (UL-PRS) configuration specifying one or more UL-PRS resource sets, wherein each UL-PRS resource set comprises one or more UL-PRS resources, and wherein all of the one or more UL-PRS resources are scheduled within the time window.

37. The UE of claim 36, wherein the at least one processor is further configured to:
perform, during the time window, measurements of DL-PRS transmissions on one or more DL-PRS resources of the one or more DL-PRS resource sets.

38. The UE of claim 36, wherein the at least one processor is further configured to:
cause the at least one transceiver to transmit, during the time window, at least one UL-PRS on the one or more UL-PRS resources.

39. The UE of claim 36, wherein a maximum duration of the time window is a UE capability, and wherein the at least one processor is further configured to:
cause the at least one transceiver to transmit, to a location server, the maximum duration of the time window.

40. The UE of claim 36, wherein the duration of the time window is a fraction of a configured transmission periodicity of one of the one or more DL-PRS resource sets.

41. The UE of claim 36, wherein all of the one or more DL-PRS resource sets have the same transmission periodicity.

42. The UE of claim 36, wherein the duration of the time window is rounded up to a slot or subframe boundary.

43. The UE of claim 36, wherein the duration of the time window is less than the duration defined by the configured transmission periodicity based on the duration defined by the configured transmission periodicity being greater than a threshold.

44. The UE of claim 36, wherein the time window corresponds to a DL-PRS measurement window, and wherein the at least one processor is further configured to:
receive, via the at least one transceiver, a slot offset parameter that specifies a start slot for the one or more DL-PRS resource sets; and
receive, via the at least one transceiver, a maximum resource offset value parameter that specifies a maximum number of the DL-PRS resources of the one or more DL-PRS resource sets of the DL-PRS instance.

45. The UE of claim 36, wherein the at least one processor is further configured to:
receive, via the at least one transceiver, a slot offset parameter that specifies a start slot for the one or more DL-PRS resource sets or the one or more UL-PRS resources; and
receive, via the at least one transceiver, a maximum resource offset value parameter that specifies a maximum number of the DL-PRS resources of the one or more DL-PRS resource sets or a maximum number of the one or more UL-PRS resources.

46. The UE of claim 36, wherein the time window is configured based on the UE being configured to report a UE reception-to-transmission (UE Rx-Tx) measurement.

47. The UE of claim 36, wherein each of the DL-PRS resources of the one or more DL-PRS resource sets of the DL-PRS instance is associated with at least one of the one or more UL-PRS resources.

48. The UE of claim 36, wherein at least some of the DL-PRS resources of the one or more DL-PRS resource sets of the DL-PRS instance are not associated with any of the one or more UL-PRS resources.

49. The UE of claim 36, wherein the one or more DL-PRS resource sets of the DL-PRS instance are configured across all the plurality of TRPs.

50. The UE of claim 36, wherein all of the one or more UL-PRS resources are scheduled within the time window.

51. The UE of claim 36, wherein:
not all of the one or more UL-PRS resources are scheduled within the time window, and
based on not all of the one or more UL-PRS resources being scheduled within the time window, an accuracy requirement for the positioning session is less than an accuracy requirement for the positioning session when all of the one or more UL-PRS resources are scheduled within the time window.

52. The UE of claim 37, wherein the at least one processor is further configured to:
report, to a location server, one or more of the measurements of the DL-PRS transmissions.

53. The UE of claim 39, wherein the maximum duration of the time window is based on a frequency range or a frequency band to which the UE can tune.

54. A positioning entity, comprising:
a memory;
at least one network interface; and
at least one processor communicatively coupled to the memory and the at least one processor, the at least one processor configured to:
cause the at least one network interface to transmit, to a user equipment (UE) engaged in a positioning session with a plurality of transmission-reception points (TRPs), a downlink positioning reference signal (DL-PRS) configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and cause the at least one network interface to transmit, to the UE, an uplink PRS (UL-PRS) configuration specifying one or more UL-PRS resource sets, wherein each UL-PRS resource set comprises one or more UL-PRS resources, and wherein all of the one or more UL-PRS resources are scheduled within the time window.

55. The positioning entity of claim 54, wherein the at least one processor is further configured to:
receive, from the UE via the at least one network interface, one or more of measurements of DL-PRS transmissions on one or more DL-PRS resources of the one or more DL-PRS resource sets.

56. The positioning entity of claim 54, wherein a maximum duration of the time window is a UE capability, and wherein the at least one processor is further configured to:
receive, from the UE via the at least one network interface, the maximum duration of the time window.

57. The positioning entity of claim 54, wherein the duration of the time window is a fraction of a configured transmission periodicity of one of the one or more DL-PRS resource sets.

58. The positioning entity of claim 54, wherein all of the one or more DL-PRS resource sets have the same transmission periodicity.

59. The positioning entity of claim 54, wherein the duration of the time window is rounded up to a slot or subframe boundary.

60. The positioning entity of claim 54, wherein the duration of the time window is less than the duration defined by the configured transmission periodicity based on the duration defined by the configured transmission periodicity being greater than a threshold.

61. The positioning entity of claim 54, wherein the time window corresponds to a DL-PRS measurement window, and wherein the at least one processor is further configured to:
cause the at least one network interface to transmit, to the UE, a slot offset parameter that specifies a start slot for the one or more DL-PRS resource sets; and
cause the at least one network interface to transmit, to the UE, a maximum resource offset value parameter that specifies a maximum number of the DL-PRS resources of the one or more DL-PRS resource sets of the PRS instance.

62. The positioning entity of claim 54, wherein the at least one processor is further configured to:
cause the at least one network interface to transmit, to the UE, a slot offset parameter that specifies a start slot for the one or more DL-PRS resource sets or the one or more UL-PRS resources; and
cause the at least one network interface to transmit, to the UE, a maximum resource offset value parameter that specifies a maximum number of the DL-PRS resources of the one or more DL-PRS resource sets or a maximum number of the one or more UL-PRS resources.

63. The positioning entity of claim 54, wherein the at least one processor is further configured to:
cause the at least one network interface to transmit, to the plurality of TRPs, the DL-PRS configuration.

64. The positioning entity of claim 54, wherein the time window is configured based on the UE being configured to report a UE reception-to-transmission (UE Rx-Tx) measurement.

65. The positioning entity of claim 54, wherein each of the DL-PRS resources of the one or more DL-PRS resource sets of the DL-PRS instance is associated with at least one of the one or more UL-PRS resources.

66. The positioning entity of claim 54, wherein at least some of the DL-PRS resources of the one or more DL-PRS resource sets of the DL-PRS instance are not associated with any of the one or more UL-PRS resources.

67. The positioning entity of claim 54, wherein the one or more DL-PRS resource sets of the DL-PRS instance are configured across all the plurality of TRPs.

68. The positioning entity of claim 54, wherein all of the one or more UL-PRS resources are scheduled within the time window.

69. The positioning entity of claim 54, wherein:
not all of the one or more UL-PRS resources are scheduled within the time window, and
based on not all of the one or more UL-PRS resources being scheduled within the time window, an accuracy requirement for the positioning session is less than an accuracy requirement for the positioning session when all of the one or more UL-PRS resources are scheduled within the time window.

70. The positioning entity of claim 56, wherein the maximum duration of the time window is based on a frequency range or a frequency band to which the UE can tune.

71. A user equipment (UE), comprising:
means for receiving, during a positioning session with a plurality of transmission-reception points (TRPs), a downlink positioning reference signal (DL-PRS) configuration specifying one or more DL-PRS resource sets, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and
means for receiving an uplink PRS (UL-PRS) configuration specifying one or more UL-PRS resource sets, wherein each UL-PRS resource set comprises one or more UL-PRS resources, and wherein the one or more UL-PRS resources are scheduled within the time window.

72. A positioning entity, comprising:
means for transmitting, to a user equipment (UE) engaged in a positioning session with a plurality of transmission-reception points (TRPs), a downlink positioning reference signal (DL-PRS) configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and
means for transmitting, to the UE, an uplink PRS (UL-PRS) configuration specifying one or more UL-PRS resource sets, wherein each UL-PRS resource set comprises one or more UL-PRS resources, and wherein the one or more UL-PRS resources are scheduled within the time window.

73. A non-transitory computer-readable medium storing computer-executable instructions, the computer-executable instructions comprising:
at least one instruction instructing a user equipment (UE) engaged in a positioning session with a plurality of transmission-reception points (TRPs) to receive a downlink positioning reference signal (DL-PRS) configuration specifying one or more DL-PRS resource sets, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and
at least one instruction instructing the UE to receive an uplink PRS (UL-PRS) configuration specifying one or more UL-PRS resource sets, wherein each UL-PRS resource set comprises one or more UL-PRS resources, and wherein the one or more UL-PRS resources are scheduled within the time window.

74. A non-transitory computer-readable medium storing computer-executable instructions, the computer-executable instructions comprising:
at least one instruction instructing a positioning entity to transmit, to a user equipment (UE) engaged in a positioning session with a plurality of transmission-reception points (TRPs), a downlink positioning reference signal (DL-PRS) configuration specifying one or more DL-PRS resource sets of a DL-PRS instance, wherein each DL-PRS resource set is associated with a TRP of the plurality of TRPs, is configured with a transmission periodicity, comprises one or more DL-PRS resources that are transmitted according to the configured transmission periodicity of the DL-PRS resource set, wherein each DL-PRS resource is scheduled to be repeated over one or more consecutive slots, wherein one transmission instance of a repetition of the one or more DL-PRS resources of the one or more DL-PRS resource sets corresponds to a DL-PRS instance, wherein all DL-PRS resources of the one or more DL-PRS resource sets of the DL-PRS instance are scheduled within a time window, and wherein a duration of the time window is less than a duration defined by a configured transmission periodicity of one of the one or more DL-PRS resource sets; and
at least one instruction instructing the positioning entity to transmit, to the UE, an uplink PRS (UL-PRS) configuration specifying one or more UL-PRS resource sets, wherein each UL-PRS resource set comprises one or more UL-PRS resources, and wherein the one or more UL-PRS resources are scheduled within the time window.

* * * * *